US012137833B2

(12) United States Patent
McLean et al.

(10) Patent No.: US 12,137,833 B2
(45) Date of Patent: Nov. 12, 2024

(54) DEVICES AND METHODS FOR FILTERING A LIQUID

(71) Applicant: ESPRO, Inc., Vancouver (CA)

(72) Inventors: Christopher R. McLean, Vancouver (CA); Bruce A. Constantine, North Attleboro, MA (US)

(73) Assignee: DKK Enterprises Inc., Toronto (CA)

( * ) Notice: Subject to any disclaimer, the term of this patent is extended or adjusted under 35 U.S.C. 154(b) by 824 days.

(21) Appl. No.: 17/144,091

(22) Filed: Jan. 7, 2021

(65) Prior Publication Data

US 2021/0153686 A1 May 27, 2021

Related U.S. Application Data

(60) Continuation of application No. 16/403,517, filed on May 4, 2019, now abandoned, which is a continuation of application No. 15/227,241, filed on Aug. 3, 2016, now Pat. No. 10,368,685, which is a continuation of application No. 14/318,371, filed on Jun. 27, 2014, now Pat. No. 9,408,490, which is a division of application No. 12/991,425, filed as application No. PCT/CA2009/000604 on May 12, 2009, now Pat. No. 8,770,097, application No. 17/144,091, filed on Jan.

(Continued)

(51) Int. Cl.
*A47J 31/38* (2006.01)
*A47J 31/20* (2006.01)
*B01D 11/02* (2006.01)

(52) U.S. Cl.
CPC .............. *A47J 31/38* (2013.01); *A47J 31/20* (2013.01); *B01D 11/0253* (2013.01)

(58) Field of Classification Search
CPC ........ A47J 31/20; A47J 31/38; B01D 11/0253
See application file for complete search history.

(56) References Cited

U.S. PATENT DOCUMENTS

| 1,025,206 A | 5/1912 | Rounds |
| 1,581,877 A | 4/1926 | Schultz |

(Continued)

FOREIGN PATENT DOCUMENTS

| CA | 1019251 A1 | 10/1977 |
| CA | 2 418 741 A1 | 8/2004 |

(Continued)

OTHER PUBLICATIONS

Extended European Search Report dated Apr. 1, 2020, for corresponding European Application No. 19162274.5.

(Continued)

*Primary Examiner* — Thien S Tran
(74) *Attorney, Agent, or Firm* — De Witt LLP; Brian R. Pollack, Esq.

(57) ABSTRACT

Embodiments of an liquid filtering device are provided including a plunger to be inserted into an container containing a liquid that can have vertical inner walls oriented parallel to a vertical axis of the container. In some implementations, the plunger includes a first surface with a seal situated at an edge of the surface. The seal is adapted for sealing against the inner walls of the infusing container as the plunger moves within the container. The plunger also includes a second surface extending from the first surface and defining a second chamber.

20 Claims, 11 Drawing Sheets

Related U.S. Application Data 7, 2021 is a continuation-in-part of application No. 15/260,151, filed on Sep. 8, 2016, now abandoned.

(60) Provisional application No. 61/127,430, filed on May 12, 2008, provisional application No. 62/217,562, filed on Sep. 11, 2015.

(56) References Cited

U.S. PATENT DOCUMENTS

| | | | |
|---|---|---|---|
| 1,954,064 A | 4/1934 | Blitz | |
| 2,299,918 A | 10/1942 | Mollenkamp | |
| 2,468,661 A | 4/1949 | Gladstone | |
| 2,629,376 A | 7/1949 | Gallice et al. | |
| 2,516,703 A | 7/1950 | Kent | |
| 2,592,485 A | 4/1952 | Stair | |
| 2,882,899 A | 7/1955 | Nogier et al. | |
| 2,793,790 A | 5/1957 | Kahler | |
| 3,158,084 A | 11/1964 | Cohn | |
| 3,260,510 A | 7/1966 | Ranson | |
| 3,319,577 A | 5/1967 | Herreshof | |
| 3,561,888 A * | 2/1971 | Jordan | A47J 31/053 |
| | | | 99/309 |
| 3,589,683 A | 6/1971 | Robin | |
| 3,657,993 A | 4/1972 | Close | |
| 3,752,604 A | 8/1973 | Dorn | |
| 3,927,608 A | 12/1975 | Doyel | |
| 3,935,318 A | 1/1976 | Mihailide | |
| 3,954,614 A | 5/1976 | Wright | |
| 3,955,634 A | 5/1976 | Slator et al. | |
| 4,066,722 A | 1/1978 | Pietruszewski et al. | |
| 4,151,092 A | 4/1979 | Grimm et al. | |
| 4,189,385 A | 2/1980 | Greenspan | |
| 4,602,558 A | 7/1986 | Kaper et al. | |
| 4,645,132 A | 2/1987 | Fregnan | |
| 4,650,583 A | 3/1987 | Bondanini | |
| 4,804,550 A | 2/1989 | Bardsley et al. | |
| 4,852,474 A | 8/1989 | Malich et al. | |
| 4,945,824 A | 8/1990 | Borgmann | |
| 4,950,082 A | 8/1990 | Carlson | |
| 5,106,239 A | 4/1992 | Krebsbach | |
| 5,141,134 A | 8/1992 | Machado | |
| 5,174,194 A | 12/1992 | Piana | |
| D348,590 S | 7/1994 | Scott | |
| 5,335,588 A | 8/1994 | Mahlich | |
| 5,464,574 A | 11/1995 | Mahlich | |
| 5,472,274 A | 12/1995 | Baillie | |
| 5,478,586 A | 12/1995 | Connor | |
| 5,487,486 A | 1/1996 | Meneo | |
| 5,494,410 A | 2/1996 | Maier-Laxhuber et al. | |
| 5,526,733 A | 6/1996 | Klawuhn et al. | |
| 5,549,573 A | 8/1996 | Waskonig | |
| D375,233 S | 11/1996 | Hirsch | |
| 5,618,570 A | 4/1997 | Banks et al. | |
| 5,622,099 A | 4/1997 | Frei | |
| 5,636,563 A | 6/1997 | Oppermann et al. | |
| 5,638,740 A | 6/1997 | Cai | |
| D384,539 S | 10/1997 | Joergensen | |
| 5,770,074 A | 6/1998 | Pugh | |
| 5,788,369 A | 8/1998 | Tseng | |
| D401,466 S | 11/1998 | Joergensen | |
| D405,642 S | 2/1999 | Toriba | |
| 5,887,510 A | 3/1999 | Porter | |
| D410,170 S | 5/1999 | Sheu | |
| 5,911,810 A | 6/1999 | Kawabata | |
| 5,913,964 A * | 6/1999 | Melton | B65D 85/816 |
| | | | 99/279 |
| 5,932,098 A * | 8/1999 | Ross | A47J 31/605 |
| | | | 210/473 |
| D413,480 S | 9/1999 | Joergensen | |
| 6,095,032 A | 8/2000 | Barnett et al. | |
| D435,195 S | 12/2000 | Joergensen | |
| 6,220,147 B1 | 4/2001 | Priley | |
| D448,601 S | 10/2001 | Yeh | |
| D448,602 S | 10/2001 | Bodum | |
| D448,603 S | 10/2001 | Yeh | |
| D449,760 S | 10/2001 | Yeh | |
| 6,296,884 B1 | 10/2001 | Okerlund | |
| D450,223 S | 11/2001 | Joergensen | |
| 6,324,966 B1 | 12/2001 | Joergensen | |
| D457,377 S | 5/2002 | Jorgensen | |
| 6,382,083 B2 | 5/2002 | Schmed | |
| 6,412,394 B2 | 7/2002 | Bonanno | |
| D462,233 S | 9/2002 | Jorgensen | |
| D453,446 S | 12/2002 | Bodum | |
| D468,597 S | 1/2003 | Kerr | |
| 6,736,295 B2 | 5/2004 | Lin et al. | |
| D493,662 S | 8/2004 | Bodum | |
| D494,803 S | 8/2004 | Bodum | |
| 6,797,160 B2 | 9/2004 | Huang | |
| 6,797,304 B2 | 9/2004 | McGonagle | |
| 6,811,299 B2 | 11/2004 | Collier | |
| D501,354 S | 2/2005 | Graves et al. | |
| D503,069 S | 3/2005 | Dilollo et al. | |
| 6,964,223 B2 | 11/2005 | O'Loughlin | |
| 6,978,682 B2 | 12/2005 | Foster et al. | |
| 7,032,505 B2 | 4/2006 | Brady | |
| 7,093,531 B2 | 8/2006 | Tardif | |
| 7,194,951 B1 | 3/2007 | Porter | |
| D542,078 S | 5/2007 | Bodum | |
| 7,213,507 B2 | 5/2007 | Glucksman et al. | |
| D563,713 S | 3/2008 | Bodum | |
| D565,887 S | 4/2008 | Bodum | |
| D566,454 S | 4/2008 | Bodum | |
| D571,610 S | 6/2008 | Bodum | |
| 7,384,182 B2 | 6/2008 | Bhavnani | |
| D573,396 S | 7/2008 | Gauss | |
| D587,069 S | 2/2009 | Bodum | |
| D594,267 S | 6/2009 | Bodum | |
| 7,578,231 B2 | 8/2009 | Liu | |
| D584,559 S | 11/2009 | Bodum | |
| D610,860 S | 3/2010 | Bodum | |
| D622,546 S | 8/2010 | Bodum | |
| 7,790,117 B2 | 9/2010 | Ellis et al. | |
| D628,846 S | 12/2010 | Bodum | |
| 7,858,133 B2 | 12/2010 | Neace, Jr. et al. | |
| 7,882,975 B2 | 2/2011 | Kelly | |
| 7,946,752 B2 | 5/2011 | Swartz et al. | |
| 7,958,816 B2 | 6/2011 | Lin | |
| 7,992,486 B2 | 8/2011 | Constantine et al. | |
| D645,290 S | 9/2011 | Bodum | |
| 8,051,766 B1 | 11/2011 | Yu et al. | |
| D652,682 S | 1/2012 | Eyal | |
| D653,492 S | 2/2012 | Enghard | |
| D654,756 S | 2/2012 | Bodum | |
| D655,134 S | 3/2012 | Gilbert | |
| D655,967 S | 3/2012 | Bodum | |
| 8,152,361 B2 | 4/2012 | Swartz et al. | |
| 8,177,968 B2 | 5/2012 | Wang | |
| D662,354 S | 6/2012 | Bodum | |
| D663,155 S | 7/2012 | Bodum | |
| 8,216,462 B2 | 7/2012 | OBrien et al. | |
| 8,272,532 B2 | 9/2012 | Michaelian et al. | |
| 8,313,644 B2 | 11/2012 | Harris et al. | |
| D677,103 S | 3/2013 | Melzer | |
| 8,387,820 B2 | 3/2013 | Park | |
| D681,388 S | 5/2013 | Bodum | |
| 8,448,810 B2 | 5/2013 | Kelly et al. | |
| 8,529,119 B2 | 9/2013 | Swartz et al. | |
| D694,579 S | 12/2013 | Khubani | |
| D695,138 S | 12/2013 | Ball | |
| D698,649 S | 2/2014 | Quint | |
| 8,641,416 B2 | 2/2014 | Leiner et al. | |
| D700,807 S | 3/2014 | Kershaw et al. | |
| D701,425 S | 3/2014 | Pearson | |
| 8,667,662 B2 | 3/2014 | Kelly | |
| 8,695,486 B2 | 4/2014 | Bodum | |
| 8,770,097 B2 | 7/2014 | McLean et al. | |
| D729,584 S | 5/2015 | Weston et al. | |
| 2001/0053399 A1 | 12/2001 | Herod | |
| 2003/0047081 A1 | 3/2003 | Mcgonagle | |
| 2003/0070979 A1 * | 4/2003 | Huang | A47J 31/20 |
| | | | 99/279 |
| 2003/0205145 A1 | 11/2003 | Chang | |

(56) References Cited

U.S. PATENT DOCUMENTS

| | | |
|---|---|---|
| 2004/0206243 A1 | 10/2004 | Foster et al. |
| 2005/0000886 A1 | 1/2005 | Reynolds et al. |
| 2005/0046211 A1 | 3/2005 | Nole et al. |
| 2005/0109689 A1 | 5/2005 | Trachtenbroit |
| 2006/0118481 A1 | 6/2006 | Trachtenbroit |
| 2006/0151381 A1 | 7/2006 | Wennerstrom |
| 2007/0028779 A1 | 2/2007 | Pigliamcampo et al. |
| 2007/0151461 A1 | 7/2007 | Edmark |
| 2007/0187421 A1 | 8/2007 | Constantine et al. |
| 2007/0251956 A1 | 11/2007 | Wasserman et al. |
| 2007/0284300 A1 | 12/2007 | Bidlingmeyer et al. |
| 2008/0041860 A1 | 2/2008 | Wiedmeyer et al. |
| 2010/0263549 A1 | 10/2010 | Lee |
| 2010/0294772 A1 | 11/2010 | Judge |
| 2010/0319549 A1 | 12/2010 | Kelty et al. |
| 2011/0056385 A1 | 3/2011 | McLean et al. |
| 2011/0168644 A1 | 7/2011 | Harris et al. |
| 2011/0309094 A1 | 12/2011 | Bodum |
| 2012/0067890 A1 | 3/2012 | Cahen et al. |
| 2012/0097042 A1 | 4/2012 | Lin |
| 2012/0199160 A1 | 8/2012 | Galbis |
| 2012/0216682 A1 | 8/2012 | Bodum |
| 2012/0328750 A1 | 12/2012 | Giordano |
| 2013/0001143 A1 | 1/2013 | Nelson |
| 2013/0142592 A1 | 6/2013 | Khowaylo et al. |
| 2013/0175278 A1 | 7/2013 | Kah, Jr. |
| 2013/0213240 A1 | 8/2013 | O'Brien |
| 2013/0233869 A1 | 9/2013 | Tamarit Rios |
| 2013/0284030 A1 | 10/2013 | Katz et al. |
| 2014/0001208 A1 | 1/2014 | Bodum |
| 2014/0008310 A1 | 1/2014 | Weston et al. |
| 2014/0054301 A1 | 2/2014 | Guoqing |
| 2014/0060337 A1 | 3/2014 | Varnum |
| 2014/0072684 A1 | 3/2014 | Madden |
| 2014/0076908 A1 | 3/2014 | Pinelli |
| 2014/0197082 A1 | 7/2014 | Weston et al. |
| 2014/0311353 A1 | 10/2014 | McLean et al. |

FOREIGN PATENT DOCUMENTS

| | | |
|---|---|---|
| CN | 200974622 Y | 11/2007 |
| CN | 201595680 U | 10/2010 |
| CN | 201691689 U | 1/2011 |
| CN | 201831469 U | 5/2011 |
| DE | 201 04 815 U1 | 6/2001 |
| EP | 1267684 B1 | 5/2006 |
| FR | 1.249.992 A | 1/1961 |
| FR | 1249992 A | 1/1961 |

OTHER PUBLICATIONS

USPTO communication dated Aug. 17, 2017 for related U.S. Appl. No. 15/227,241. Third-Party Submission under 37 CFR 1.290 (filed Aug. 14, 2017), 27 sheets.

International Preliminary Report on Patentability, issued Nov. 17, 2010, and International Search Report, issued Aug. 6, 2009, for related application PCT/CA2009/000604, and 4 pages.

La Marzocco International, "Swift EPS_B Operating Manual V1.0," copyright 2002, pp. 1-31 (incl. pp. 8-12, 19, 25, 20-30), La Marzocco, International, USA.

Macap, <http://www.macap.it/english/prodotto.asp?cat=1&subcat=4>, accessed Mar. 15, 2005, posted as early as 2002, p. 1.

1st-Line Equipment, <http://www.1st-line.net/cgi-bin/category.cgi?item=CPS&type=store>, accessed Mar. 15, 2005, posted as early as 2002, pp. 1-2.

Coffeegeek, <http://www.coffeegeek.com/reviews/accessories/autotamper/tenacioustommy>, posted Oct. 24, 2002, pp. 1-5.

Schomer, D.C., <http://www.lucidcafe.com/cafeforum/schomertable11.html>, revised Oct. 24, 1997, copyright 1996-97, pp. 1-2.

Crankshaw, J., <http://home.att.net/~jcrankshaw/tamper.htm>, accessed Sep. 16, 2003, copyright 199-2002, pp. 1-3.

Coffee Research Institute, "Tamping," <http//www.coffeeresearch.org/espresso/tamping.htm>, accessed Nov. 26, 2004, posted 2001 or earlier, pp. 1-3.

Medium Espro Press, available at https://www.kickstarter.com/projects/bruceconstantine/the-medium-espro-press, Feb. 26, 2013.

Espro Press, available at https://www.kickstarter.com/projects/bruceconstantine/the-espro-press?ref=nav_search, Nov. 25, 2011.

European Supplemental Search Report in related application No. EP 09745330, Jul. 28, 2015.

\* cited by examiner

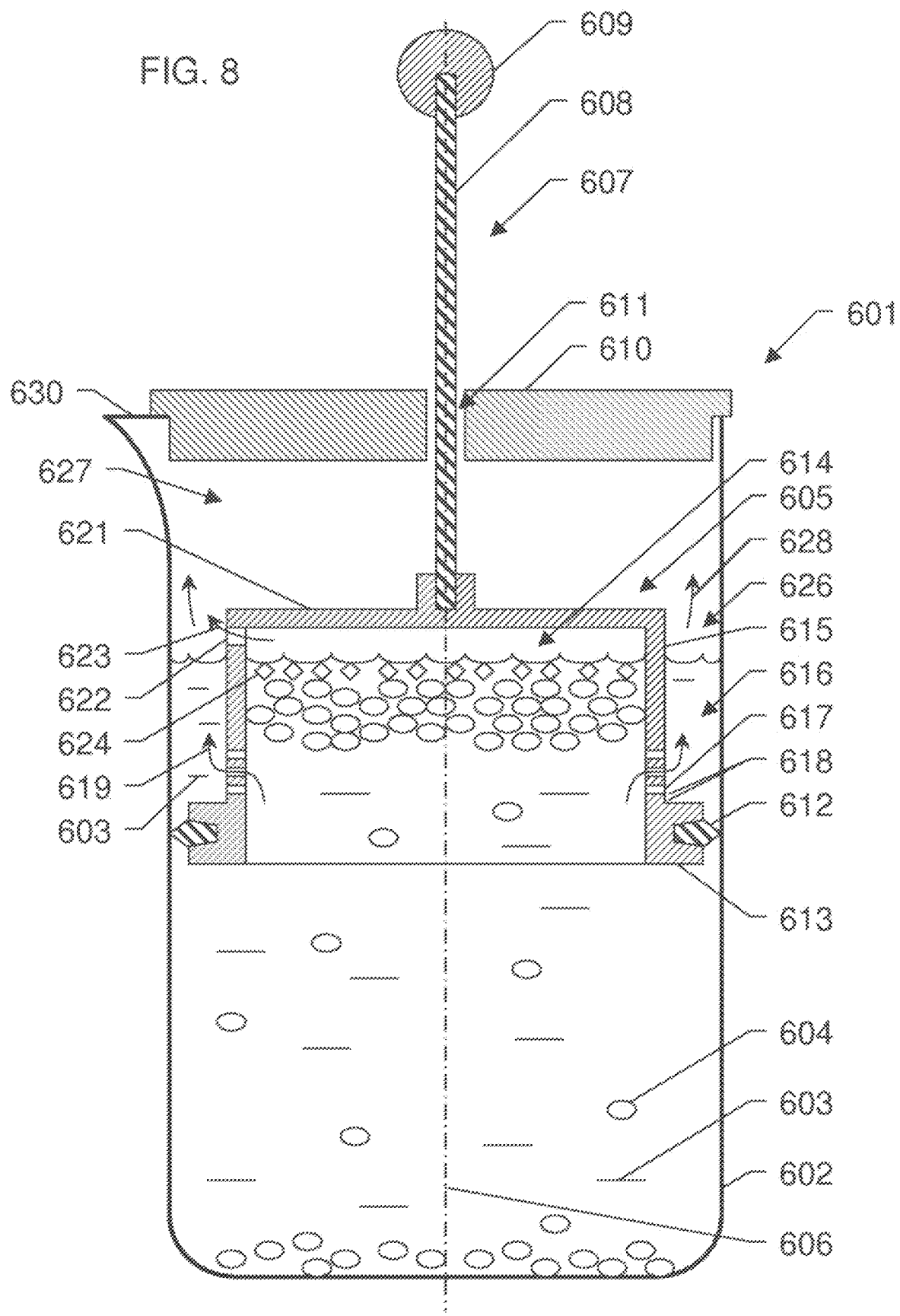

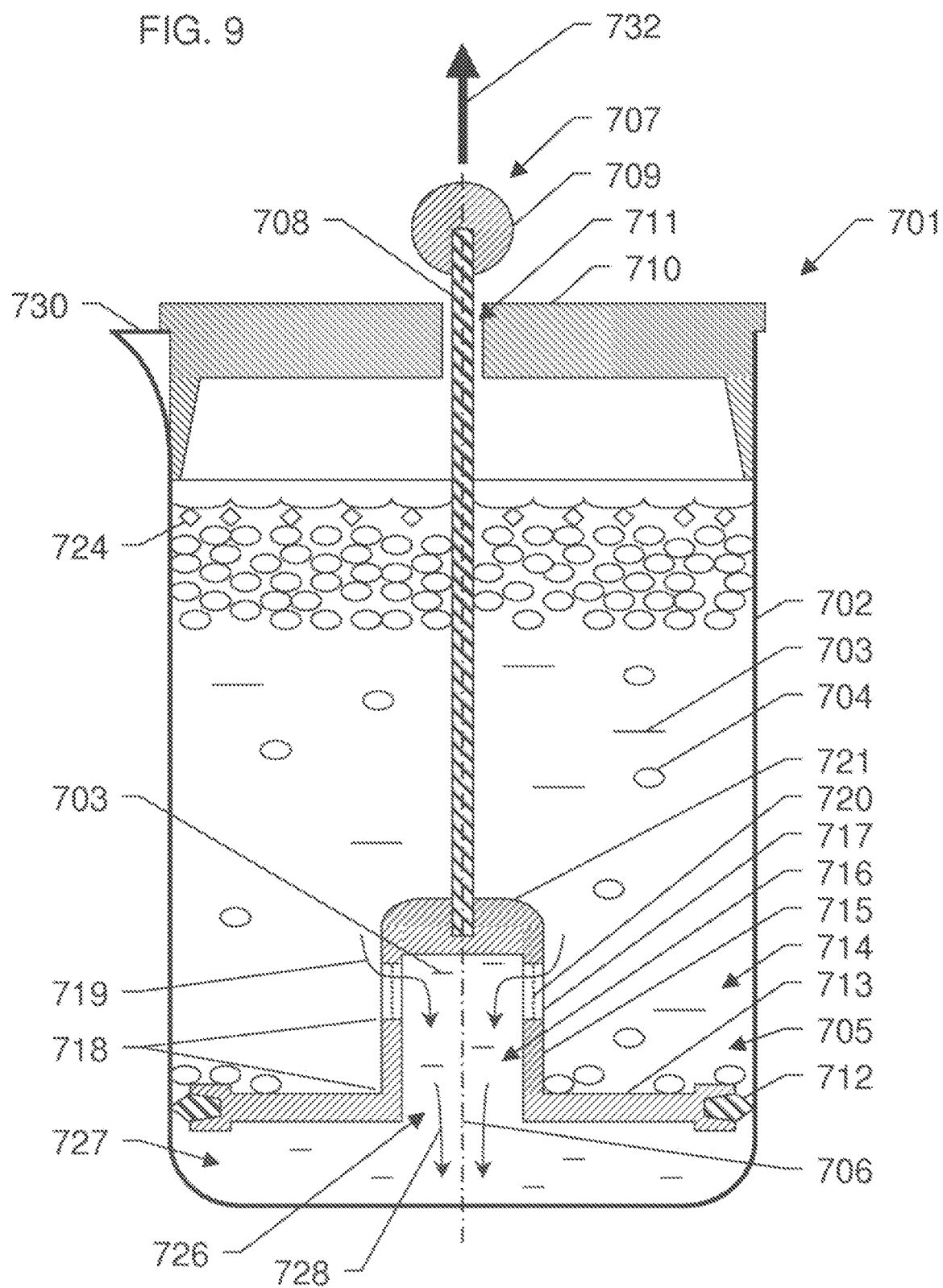

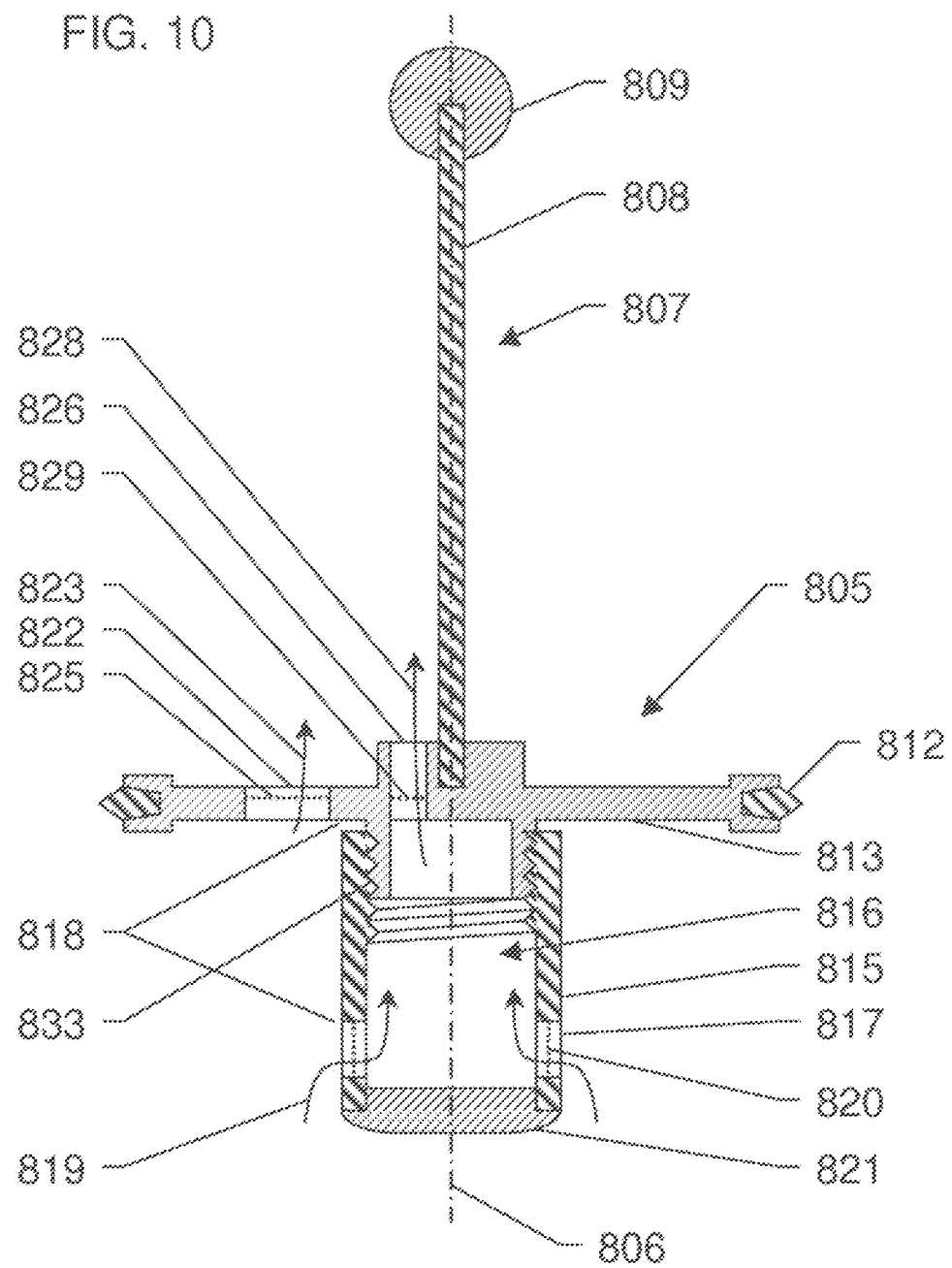

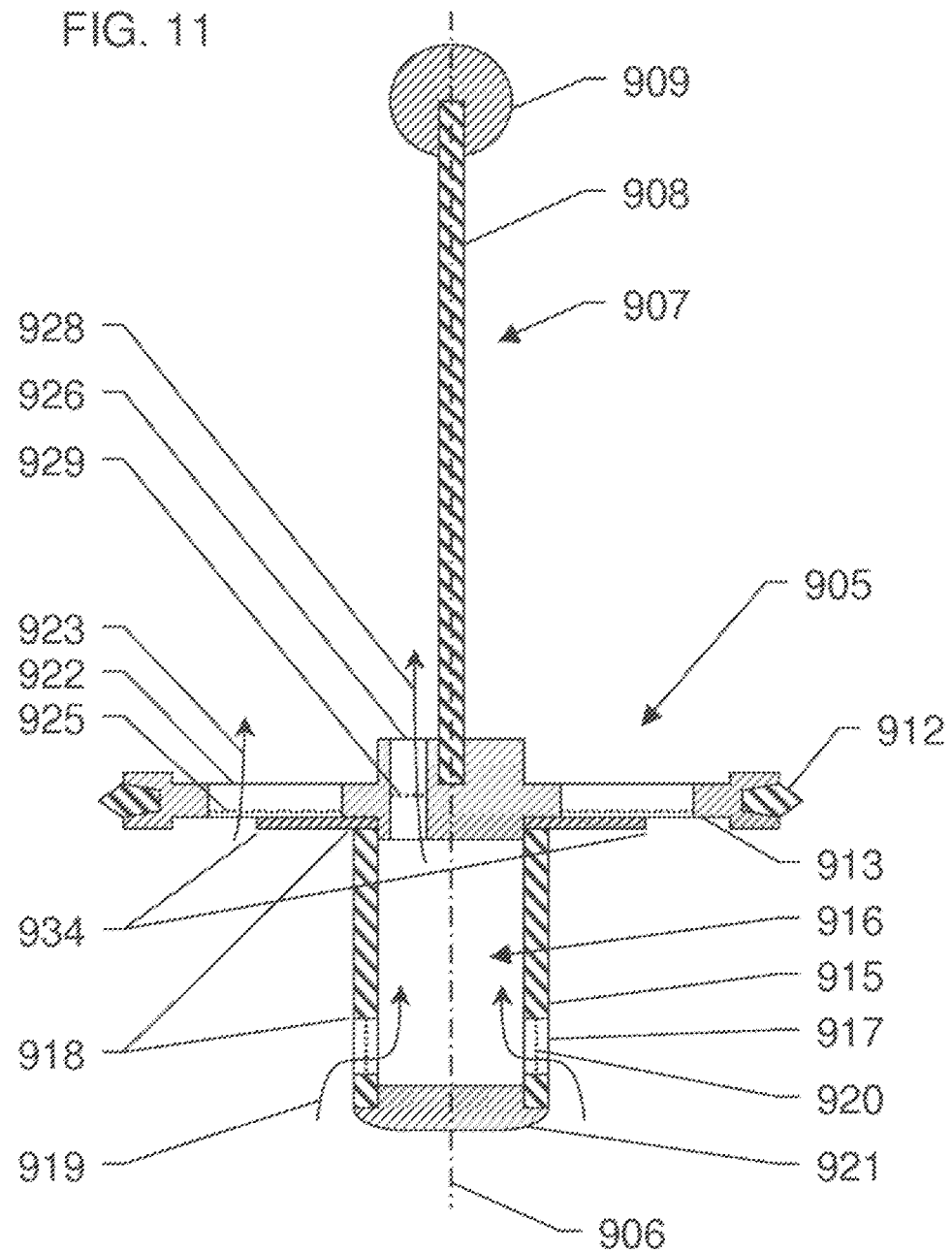

DEVICES AND METHODS FOR FILTERING A LIQUID

CROSS-REFERENCE TO RELATED APPLICATIONS

This application claims the benefit of priority to and is a continuation of U.S. patent application Ser. No. 16/403,517, filed May 4, 2019, which in turn claims the benefit of priority to and is a continuation of U.S. patent application Ser. No. 15/227,241, filed Aug. 3, 2016, which in turn claims the benefit of priority to and is a continuation of U.S. patent application Ser. No. 14/318,371, filed Jun. 27, 2014, which in turn is a division of and claims the benefit of priority to U.S. patent application Ser. No. 12/991,425, filed Nov. 5, 2010, which in turn is a U.S. National Stage of International Application Number PCT/CA2009/000604, filed May 12, 2009, and published on Nov. 19, 2009 as WO 2009/137915, which in turn claims the benefit of priority to U.S. Provisional Patent Application No. 61/127,430, filed May 12, 2008. This application also claims the benefit of priority to and is a continuation of U.S. patent application Ser. No. 15/260,151, filed Sep. 8, 2016, which in turn claims the benefit of priority to and is a continuation of U.S. Patent Application Ser. No. 62/217,562, filed Sep. 11, 2015. The content of each of the foregoing patent applications is incorporated by reference herein in its entirety for any purpose whatsoever.

BACKGROUND OF THE DISCLOSURE

Field

The present disclosure relates generally to devices capable of carrying out an extraction of an infusible material, and methods of use thereof, and more particularly to an apparatus for separating an extract of an infusible material from a mixture of the extract and the infusible material, after extraction of the infusible material has taken place.

Description of Related Art

Solvent extraction of an infusible material typically involves the removal of one or more of the extractable constituents of an infusible material, by contact with a solvent, to form an extract. In many common extractions, a suitable solvent material may be mixed with an infusible material, resulting in a mixture of an extract and the infusible material after extraction has taken place. An exemplary common type of extraction is the extraction of constituents from infusible plant-based materials using water, and particularly hot water, as a solvent, to form a mixture of a substantially aqueous extract and the infusible plant-based material after extraction has taken place.

A number of input parameters affecting the process of extraction may be associated with the characteristics of the infusible material itself, independent from the solvent extraction apparatus. Three exemplary known infusible material characteristics in particular include:
  the mass of infusible material;
  the time between crushing or grinding (if required) of the infusible material and the extraction process;
  the particle size and particle size distribution of the infusible material.

A further number of input parameters known to affect the process of extraction may typically be controlled by the solvent extraction apparatus and method of performing the extraction. Such exemplary extraction parameters related to the extraction apparatus and method of use include:
  the volume of solvent relative to the volume or mass of infusible material;
  the extraction time (contact time of the solvent with the infusible material);
  the temperature of the mixture of infusible material and extract (note that the initial solvent temperature may be set externally from the solvent extraction apparatus, such as in the example of externally heated water). The temperature of the mixture may also vary over time, due to cooling for example.
  the effective aperture size of the filtering means used to separate the extract from the infusible material, after the extraction is complete.

The final properties of the extract produced by a solvent extraction process are typically affected and controlled by the above-described infusible material and extraction apparatus and method characteristics. Exemplary such final properties of the extract resulting from the solvent extraction process include:
  the final temperature of the extract;
  the soluble constituents of the infusible material contained in the extract;
  the insoluble constituents of the infusible material contained in the extract (e.g. fine particles of the infusible material and/or insoluble oils extracted from the infusible material that pass through the filtering means);
  the volume of extract produced.

For many common solvent extractions, particularly exemplary solvent extractions of plant materials using hot water to produce a beverage such as coffee or tea, for example, the preferred characteristics for the extraction process may be similar. For example, in some common exemplary extractions, smaller particles of the infusible material may be preferred over larger particles, since with larger particles, the outer surface of the particles may be undesirably over-extracted by the solvent during the extraction, while the inner core of the larger particles remains undesirably under-extracted. In such a case, the use of smaller infusible material particles may desirably contribute to more consistent extraction of the infusible material particles. Further, the extraction process may also proceed more quickly using smaller particles of infusible material, and therefore desirably take less time to complete. Such desirable faster extraction may also facilitate a more consistent temperature throughout the extraction, particularly in cases where a non-heated solvent extraction apparatus is used, wherein hot solvent, such as hot water for example, is placed in the extraction apparatus at an initial temperature, and the temperature of the extract and infusible material mixture decreases as the extraction process proceeds. Accordingly, there may typically exist a preferred extraction time period for a given infusible material particle size, wherein the preferred extraction time is shorter for relatively smaller particle sizes.

An additional desirable benefit of using smaller particles of infusible material for an extraction process may be realized in extractions where the infusible material and the extract separate due to density (i.e. wherein the infusible material generally floats or sinks in the extract). In such cases of unequal infusible material and extract densities such as in the exemplary case of extractions to produce coffee where the infusible material typically floats in the extract, if larger infusible material particles are used, the resulting slower extraction process may undesirably over-extract the bottom layers of the infusible material in contact with the extract, and undesirably under-extract the top layers of the infusible material which may be floating substantially above the extract. In such cases, the use of smaller infusible material particles which may complete extraction more quickly may desirably reduce the occurrence of such under and over-extraction.

In some common exemplary extractions, the above-described relatively faster extraction resulting from using smaller infusible material particles may also desirably reduce the extraction of some undesirable constituents of infusible material. For example, in the case of coffee extractions, faster extraction may desirably reduce the amount of caffeine extracted from the infusible material. Relatively high levels of caffeine may be undesirable due to its bitter flavour and stimulant properties. Additionally, relatively faster extraction may reduce variation in temperature of the extract and infusible material mixture during extraction using some types of extraction apparatus, as described above. Such reduced temperature variation may reduce extraction of sour constituents of coffee by lower than ideal temperature extraction, or reduce extraction of bitter constituents of coffee by higher than ideal temperature extraction, for example.

For reasons such as those detailed above, the use of relatively fine infusible material particles may be desirable for conducting extractions to produce a desirable extract product. However, some exemplary commonly known extraction devices, such as a traditional French press coffee and/or tea making apparatus, for example, may be limited in the lower bounds of infusible material particle size that are practical for use in the apparatus. In some common extraction devices like an exemplary french coffee press, and variations thereon, a piston or filter component is used to separate infusible material from the extract upon completion of extraction. Such separation may be achieved by physically filtering the extract to flow through a layer of retained infusible material accumulated on the surface of the piston or filter component and then through a filtering means in the piston or filter component as the piston or filter is pushed through the mixture of extract and infusible material from one end of the extraction apparatus to the other. In other similar known extraction devices, a piston or filter component may be powered mechanically or pneumatically, for example to physically move the component and filter the extract.

Although smaller infusible material particle size may be desirable as explained above, commonly known extraction devices such as a French coffee press as described above typically cannot function acceptably with infusible particle sizes below a certain size, as such smaller particles may typically unacceptably clog the filtering means, or pass through or around the filtering means and into the extract. Common unacceptable outcomes of filter medium clogging in known extraction devices may include:

making it difficult or impossible to push the extract through the clogged filter and accumulated infusible material, which may result in the application of excessive pressure to a piston or filter component which in an extreme case could lead to breakage of the apparatus or potential frustration and/or harm to a user;
  passage of unacceptable amounts of small infusible material particles around the piston or filter component or seals associated therewith, which then become undesirably entrained in the extract, which may result in an unwanted muddy or gritty texture to the extract; and
  passage of unacceptable concentrations of small infusible material particles (fines) through the filter and into the extract. The solvent in the extract may then continue the extraction process on such passed infusible material and extract undesirable constituents of the infusible material degrading the quality of the extract or even render the extract unpalatable in the case of a beverage extract.

Due to the undesirable results of using smaller infusible material particles in some common extraction devices as described above, many such common extraction devices according to the prior art (such as french coffee and/or tea press devices for example) have effectively required the use of larger particle sizes for infusible materials in order to allow separation of the resulting extract and infusible material by use of a piston and filter component. Such required larger infusible material particles typically result in a slower progress of the extraction process, and therefore typically necessitates a relatively longer extraction time. Longer extraction times associated with use of some common extraction devices may undesirably reduce the quality of the resultant extract by such exemplary factors as:

over-extraction of the outer surfaces of the infusible material particles, while leaving the inner core of such particles under-extracted;
  time waste and delay due to longer extraction times required;
  potential increase in extraction of certain extraction duration-sensitive undesirable constituents, such as caffeine, or increase in undesirable characteristics of the extract due to either over or under-extraction of the infusible material; and
  potential increase in variation of the temperature of the extraction due to cooling of the extract/infusible material mixture in unheated extraction devices, which may undesirably change the amount of certain temperature-sensitive extractable constituents which may be extracted from the infusible material.

SUMMARY OF THE DISCLOSURE

It is an object of the present disclosure to provide an improved liquid filtration device to address some of the shortcomings of liquid filtration devices known in the art.

BRIEF DESCRIPTION OF THE DRAWINGS

FIG. 8 depicts a vertical section of yet a further alternative exemplary embodiment of a solvent extraction apparatus according to an embodiment of the present disclosure, including a piston/filter plunger element in a starting position.

FIG. 9 depicts a vertical section of an alternative exemplary embodiment of a solvent extraction apparatus according to an embodiment of the present disclosure, including a piston/filter plunger element in a lower position for movement in a reverse direction.

FIG. 10 depicts a vertical section of an alternative exemplary embodiment of a piston/filter plunger element including an adjustable screw according to an embodiment of the disclosure.

FIG. 11 depicts a vertical section of an alternative exemplary embodiment of a piston/filter plunger element including an adjustable vent opening according to an embodiment of the disclosure.

DETAILED DESCRIPTION

Figure 1:
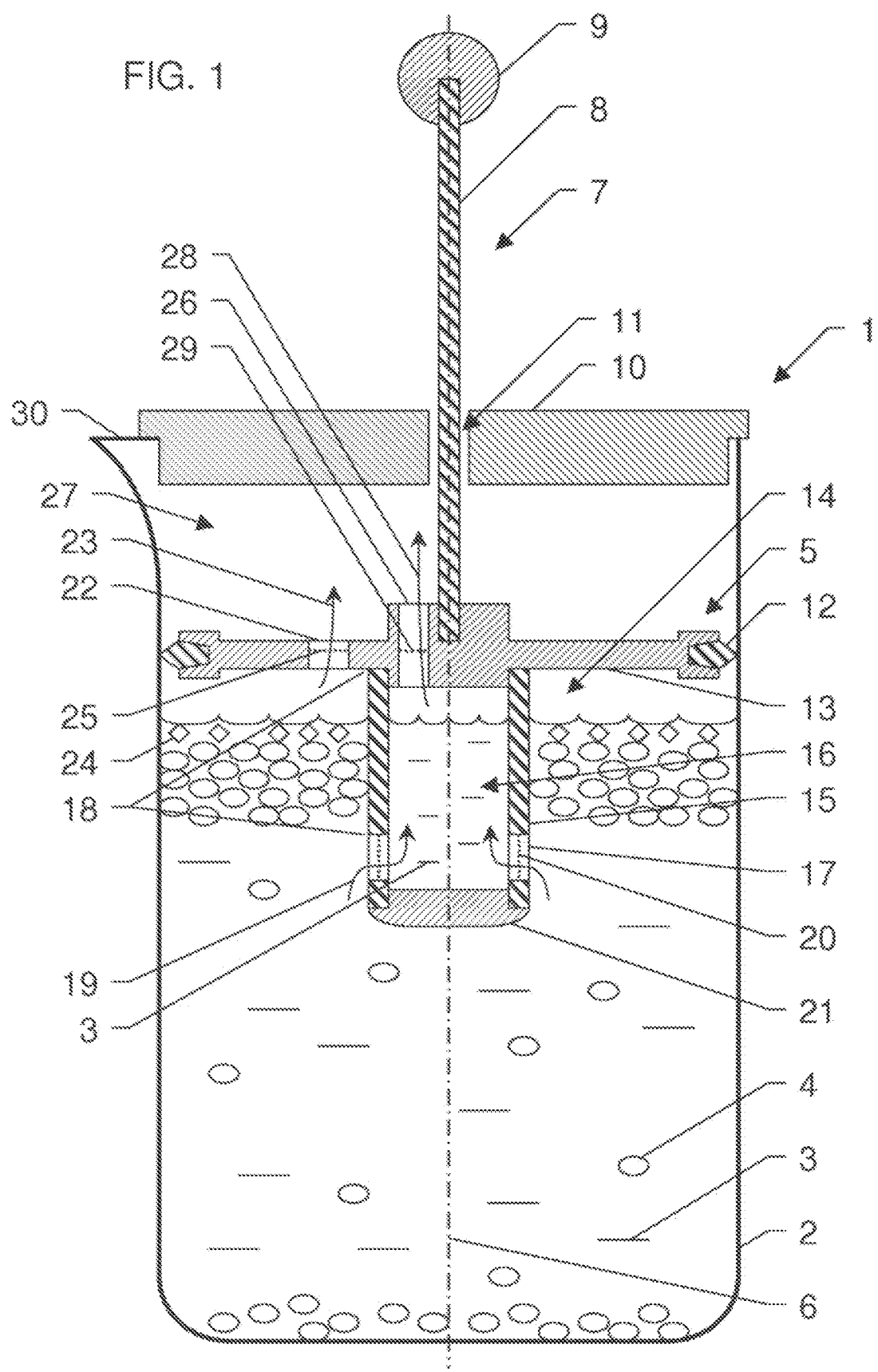
FIG. 1 depicts a vertical section of an exemplary solvent extraction apparatus according to an embodiment of the present disclosure, showing a piston/filter plunger element in a starting position inside an infusing container.

Referring to FIG. 1, a solvent extraction apparatus 1 according to an embodiment of the disclosure is shown, configured similarly to a French press type coffee or tea making apparatus. The solvent extraction apparatus 1 comprises exemplary walled cylinder infusing container 2 containing a mixture of extract 3 and infusible material 4. Plunger element 5 is adapted to fit within infusing container 2 of solvent extraction apparatus 1, and to be moved within the infusing container 2 along a vertical axis thereof, such as central vertical axis 6, by means of a plunging means attached to the plunger element 5. The plunging means may comprise a central elongated handle 7 comprising rod 8 and optional knob 9, for example, which may be grasped by a user to move the plunger element 5. The extraction apparatus 1 may additionally comprise a lid 10 with central hole 11 through which rod 8 may pass to assist in centering the plunger element 5 and rod 8 inside infusing container 2 and prevent it from tilting. Plunger element 5 additionally comprises sealing means 12 situated at the edge of a first surface or wall 13 of the plunger element 5, which is oriented substantially transverse to the vertical axis 6. In use inside infusing container 2, the first surface 13 and sealing means 12 of the plunger element 5 define a first chamber 14 containing the mixture of extract 3 and infusible material 4. FIG. 1 shows the extraction apparatus 1 in a first or starting position for separating the extract 3 from the mixture of extract 3 and infusible material 4 in infusing container 2.

The plunger element 5 further comprises a second surface or wall 15 depending from and oriented substantially perpendicular to the first surface 13, defining second chamber 16 containing extract 3. In some embodiments, the second surface or wall 15 may enclose the second chamber 16, whereas in other embodiments, second chamber 16 may comprise a partially or completely open top and/or bottom, for example. The joint between the first surface 13 and the second surface 15 is substantially leak proof with respect to extract 3 and infusible material 4. The second surface 15 of plunger element 5 also comprises one or more extract flow openings 17. In an exemplary embodiment, at least a portion of the one or more extract flow openings 17 are situated at a depth 18 separated from the first surface 13 along the vertical axis 6, either above or below the first surface 13. The one or more extract flow openings 17 are adapted to permit flow of extract 3 from the first chamber 14 (containing a mixture of extract 3 and infusible material 4) to the second chamber 16 (containing extract 3) as shown by arrow 19. In another embodiment, the second surface or wall 15 may depend from the first surface 13, extending away from the first surface 13 at a non-perpendicular angle. In an exemplary such embodiment, the second surface or wall 15 may extend away from the first surface 13 at an angle between about 45-85 degrees, for example. The further embodiments of the inventive plunger element described below in FIGS. 2-11 may also be similarly adapted such that the second surface or wall may extend away from the first surface at a non-perpendicular angle.

The one or more extract flow openings 17 in the second wall 15 typically comprise one or more filter elements 20 within or across the extract flow openings 17, such that extract 3 flowing through the openings 17 must substantially pass through the filter elements 20. The one or more filter elements 20 may be desirably adapted to control the passage of infusible material 4 through the openings 17 to allow substantial separation of the extract 3 from the infusible material 4. In some embodiments, apertures in the filter elements 20 may be small enough to substantially exclude the infusible material 4 from passing through the openings 17. The filter elements 20 may be made from any suitable material such as one or a combination of: polymer, metal, ceramic, composite, cloth, felt, paper, or other suitable materials, for example. The filter elements 20 can be formed by any suitable method, such as by one or more of: stamping, chemical etching, laser etching, molding, weaving, welding, machining, sintering, felting, foaming, paper making, piercing, or any other method adapted to create small and preferably uniform apertures. A common embodiment of a filter element 20 includes a screen or mesh having many apertures comprised of a suitable material as described above. Additionally, the filter elements 20 may be multi-staged, comprising a plurality of individual filter elements.

In the exemplary embodiment of the present disclosure shown in FIG. 1, the infusing container 2 comprises a substantially vertical walled cylinder container, with a substantially circular cross-section, the first surface 13 of plunger element 5 is substantially circular in cross-section adapted to fit inside the cylindrical infusing container 2, and the second surface 15 is substantially cylindrical with a substantially circular cross-section, and a plug or end wall 21 closing the bottom of the second wall 15. Sealing means 12 are situated around the substantially circular outside edge of the first surface 13 of plunger element 5 to provide a seal against the cylindrical wall of the infusing container 2 when the plunger element 5 is moved inside the container, to substantially prevent extract 3 or infusible material 4 from leaking around the sealing means 12. In alternative embodiments of the disclosure, the infusing container 2 and mating plunger element 5 and first surface 13 thereof may optionally have another cross-sectional shape, such as a square or rectangular or other shape for example, wherein sealing means 12 may be situated around the edge or edges of the first surface 13 of the plunger element 5. Further, in alternative embodiments, the second wall 15 of the plunger element 5 may optionally have another shape, such as a rectangular prism, or conical frustum, for example. In an alternative embodiment, plunger element 5 according to the disclosure may be provided independently, adapted to fit inside an existing infusing container design, for use as an extraction apparatus. In such an embodiment, the inventive plunger element 5 may be adapted for retrofittable use with one or more existing infusing containers, such as one or more standard or commonly available infusing containers from existing french press extraction devices, as are known in the art.

In embodiments of the disclosure including an infusing container 2, the infusing container 2 may be made from any suitable material such as one or more of glass, plastic, ceramic, metal or other suitable material, for example. Additionally, the infusing container 2 may optionally include a double-layered wall, such as a double metal wall, with a vacuum or other suitable and preferably insulative substance between the two walls of the infusing container 2, such as to reduce variations in temperature inside the container 2 during the extraction process. Further, the plunger element 5 and first wall 13 and second wall 15 components thereof may be made from any suitable material such as one or more of polymer, composite, metal, ceramic or other suitable materials, for example.

Sealing means 12 may comprise any suitable known seal material and/or design. Exemplary such seal designs may include single or multiple lip seals, single or multiple wiper seals, and single or multiple U-cup seal designs, for example. Suitable such single or multiple U-cup seal designs may desirably be self-energising, such that an outer edge of the U-cup seal actively engages and seals with the inner wall of container 2 as plunger element 5 is moved within the container 2 and against the fluid mixture of extract 3 and infusible material 4. Exemplary suitable seal materials may comprise one or more of: silicone, polymers (such as polyurethane for example) and silicone or polymer materials impregnated with carbon or other additives, for example. Additionally, sealing means 12 may comprise one or more such suitable seal materials by themselves, or alternatively, such seal materials may surround or be overmolded over a support material, such as a metal or composite support material, for example. The above-described exemplary sealing means materials and designs may also apply to sealing means incorporated in other embodiments of the disclosure, such as those described below.

The plunger element 5 may also optionally include one or more vent openings 22. The vent openings 22 are adapted to permit the flow of air out of the first chamber 14 through the vent openings 22, as represented in FIG. 1 by arrow 23, as the plunger element 5 is moved inside the infusing container 2. In some exemplary embodiments of the disclosure, extraction of the infusible material 4 may also result in the extraction of low density extractable constituents 24, such as oils or other constituents having a lower density than the remainder of extract 3, and which may typically float on top of the extract 3 in first chamber 14. In such embodiments comprising low density extractable constituents 24, the one or more optional vent openings 22 may also permit the flow of at least a portion of the low density extractable constituents 24 out of the first chamber 14 through the vent openings 22. According to another embodiment, vent openings 22 may also optionally include vent filter elements 25, similar to extract flow opening filter elements 20 described above, and may be made from similar suitable materials and by similar suitable methods to those described above in reference to filter elements 20. Optional vent filter elements 25 may also be multi-staged, comprising a plurality of individual filter elements. In a further optional embodiment, the one or more vent openings 22 may be adjustable or configurable to control the amount of air and/or low density extractable constituents 24 which may flow out of the first chamber 14 through the vent openings 22.

In some embodiments of the disclosure, such as that shown in FIG. 1, the plunger element 5 may also optionally include one or more extract flow paths 26 in the plunger element 5 to permit flow of extract 3 from the second chamber 16 to a third extract chamber 27 through the flow path 26, as generally indicated by arrow 28. Extract flow path 26 may be an opening located in the first surface 13 of the plunger element 5, or more generally in the plunger element 5. The extract flow path 26 may also optionally include one or more extract flow path filter elements 29, substantially similar to extract flow opening filter elements 20 described above, and may be made from similar suitable materials and by similar suitable methods to those described above in reference to filter elements 20. Optional extract flow path filter elements 29 may also be multi-staged, comprising a plurality of individual filter elements.

In some common exemplary embodiments of the disclosure, the extraction apparatus 1 may be configured for extracting a hot beverage extract 3 from infusible plant material 4, such as in embodiments where infusible material 4 may comprise coffee grounds, tea leaves or herbal infusibles, for example, and extract 3 may comprise coffee, tea or herbal tisane, respectively. In the common example of coffee extraction, the extraction of ground coffee infusible material 4 may result in a coffee extract 3, and one or more aromatic coffee oil low density constituents 24.

Figure 2:
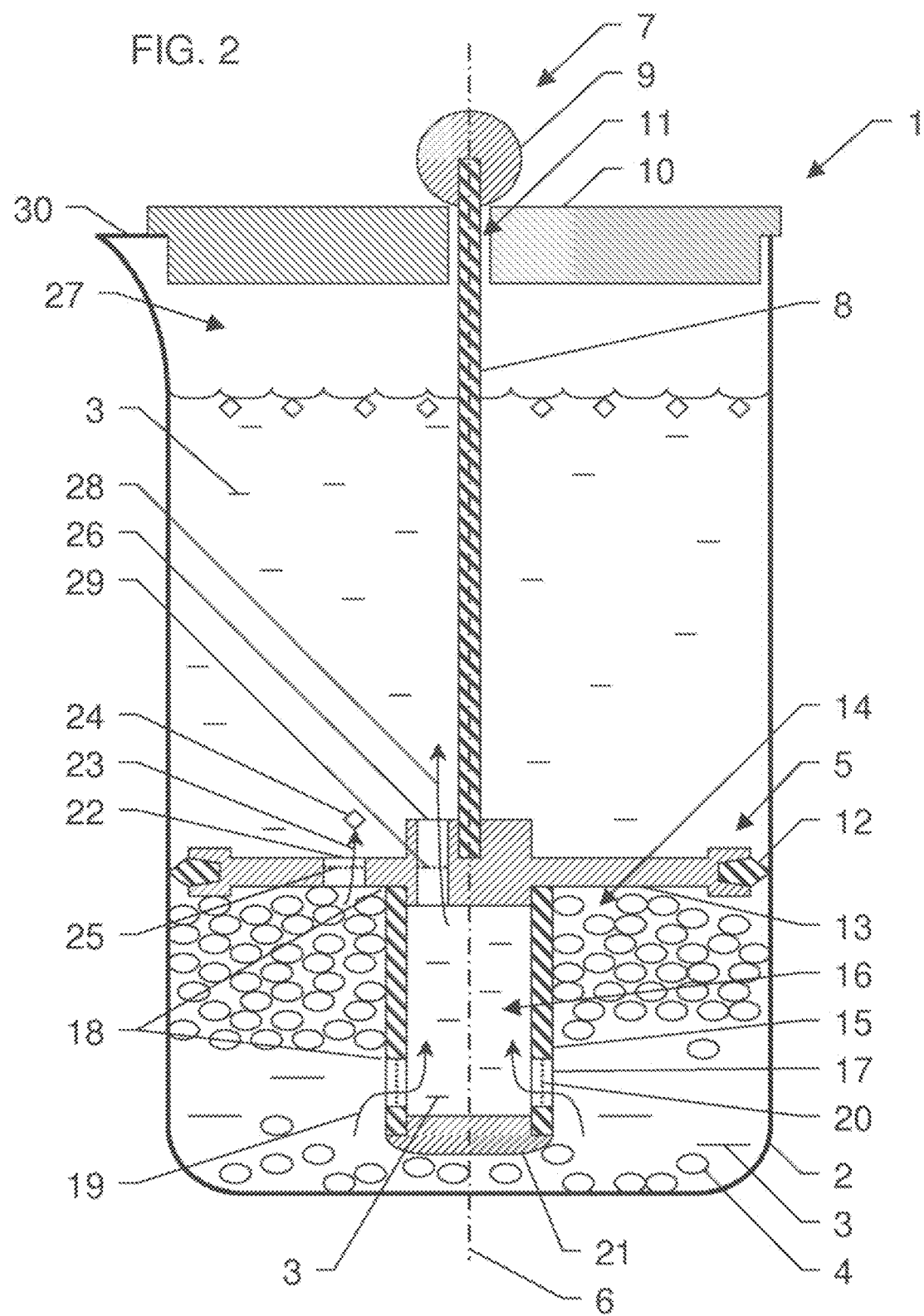
FIG. 2 depicts a vertical section of the exemplary solvent extraction apparatus embodiment depicted in FIG. 1, with the piston/filter plunger element in a second position.

Referring now to FIG. 2, the solvent extraction apparatus 1 of FIG. 1 is shown in a second position where plunger element 5 has been moved to substantially the bottom of the infusing container 2, such as by a user pressing on knob 9 of the plunger element 5. As the plunger element 5 is moved in the infusing container 2 containing a mixture of extract 3, infusible material 4 and in some embodiments low density constituent(s) 24, air and at least some of the low density constituent 24 (if present) may flow through vent opening 22 in the first surface 13, and extract 3 flows through the extract flow opening(s) 17 in the second wall 15 from the first chamber 14 into the second chamber 16, and then through the extract flow path(s) 26 into the third extract chamber 27. Extract 3 may typically flow through extract flow opening(s) 17 and subsequently extract flow path(s) 26 rather than through vent opening 22 due to the fact that the accumulation of infusible material 4 against the vent opening 22, or optionally the small size of vent opening 22, increases the resistance to fluid flow through the vent opening 22 in comparison to an extract flow opening 17 or extract flow path 26. The extract filter element(s) 20 and optionally also vent filter element(s) 25 and extract flow path filter element(s) 29 act to substantially prevent the flow of infusible material 4 from the first chamber 14 into either of the second chamber 16 or the third chamber 27, effectively and desirably separating the extract 3 (and potentially also low density constituent 24 if present) from the infusible material 4.

Following the separation of extract 3 (and potentially also low density constituent 24 if present) from the infusible material 4 by moving the plunger element 5 inside the infusing container 2, the separated extract 3 (and any low density constituent 24) may be stored in the third extract chamber 27 until desired for use without further contact with infusible material 4.

The infusing container 2 may also optionally include a pouring spout 30, which may be used to pour the separated extract 3 from the third chamber 27 for consumption or other use. The infusing container 2 may further optionally include a handle (not shown) to facilitate lifting or moving the extraction apparatus 1 by a user.

Figure 3:
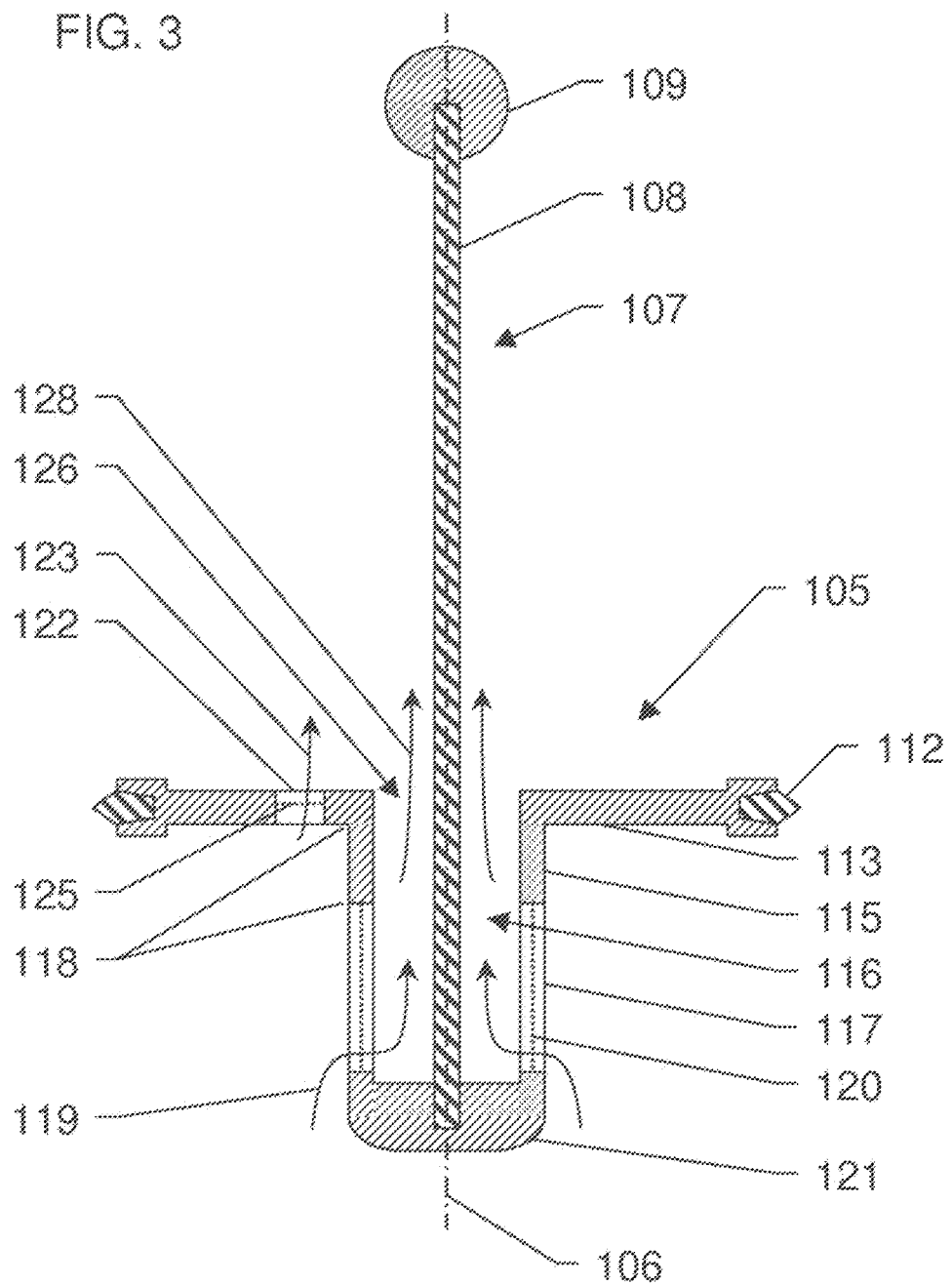
FIG. 3 depicts a vertical section of an alternative exemplary embodiment of a piston/filter plunger element according to an embodiment of the disclosure.

Referring to FIG. 3, a vertical section of an exemplary embodiment of a plunger element 105 according to an embodiment of the disclosure is shown, configured similarly to a French press type coffee and/or tea making plunger. Plunger element 105 is adapted to fit within an infusing container similar to that shown in FIG. 1, and to be moved within the infusing container (not shown) along a vertical axis thereof, such as central vertical axis 106, by means such as central elongated handle 107. Handle means 107 may comprise rod 108 and optional knob 109, for example, which may be grasped by a user to move the plunger element 105.

Plunger element 105 additionally comprises sealing means 112 situated at the edge of a first surface or wall 113 of the plunger element 105, which is oriented substantially transverse to the vertical axis 106.

The plunger element 105 further comprises a second surface or wall 115 depending from and oriented substantially perpendicular to the first surface 113, defining a fluid chamber 116, which is substantially open at one end. Similar to the plunger element 5 shown in FIG. 1, the joint between the first surface 113 and the second surface 115 of plunger 105 is substantially leak proof, and the second surface 115 of plunger element 105 also comprises one or more extract flow openings 117, wherein at least a portion of the one of more extract flow openings 117 is situated at a depth 118 separated from the first surface 113, below the first surface 113 along the vertical axis 106. The one or more extract flow openings 117 are adapted to permit flow of extract into chamber 116 as shown by arrow 119.

The one or more extract flow openings 117 in the second wall 115 typically comprise one or more filter elements 120 within or across the extract flow openings 117, such that extract flowing through the openings 117 as shown by arrow 119 must substantially pass through the filter elements 120. Similar to exemplary plunger element 5 of FIG. 1, the one or more filter elements 120 may be desirably adapted to control the passage of infusible material through the openings 117 to allow substantial separation of the extract from the infusible material, and optionally, apertures in the filter elements 120 may be small enough to substantially exclude the infusible material from passing through the openings 117. Extract flow path filter elements 120 are substantially similar to extract flow opening filter elements 20 described above, and may be made from similar suitable materials and by similar suitable methods to those described above in reference to filter elements 20.

In the exemplary embodiment of the present disclosure shown in FIG. 3, the first surface 113 of plunger element 105 is substantially circular in cross-section adapted to fit inside a cylindrical infusing container, and the second surface 115 is substantially cylindrical with a substantially circular cross-section, and a plug or end wall portion 121 closing the bottom of the second surface or wall 115. Sealing means 112 are essentially similar to the sealing means 12 described above with respect to FIG. 1, and are situated around the substantially circular outside edge of the first surface 113 of plunger element 105, performing the same sealing function as described above with reference to FIG. 1. In alternative embodiments of the disclosure, the infusing container and mating plunger element 105 and first surface 113 thereof may optionally have another cross-sectional shape, such as a square or rectangular or other shape for example, wherein sealing means 112 may be situated around the edge or edges of the first surface 113 of the plunger element 105. Further, in alternative embodiments, the second wall 115 of the plunger element 105 may optionally have another shape, such as a rectangular prism, or conical frustum, for example.

The plunger element 105 and first wall 113 and second wall 115 components thereof may be made from suitable materials such as described above in reference to plunger element 5 of FIG. 1. As in plunger element 5, plunger element 105 may optionally also include one or more vent openings 122 adapted to permit the flow of air through the vent openings 122, as represented in FIG. 3 by arrow 123, as the plunger element 105 is moved inside the infusing container. In some exemplary embodiments of the disclosure, extraction of the infusible material may also result in the extraction of low density extractable constituents, such as oils or other constituents having a lower density than the remainder of the extract, and which may typically float on top of the extract. In such embodiments comprising low density extractable constituents, the one or more vent openings 122 may also permit the flow of at least a portion of the low density extractable constituents. Vent openings 122 may also optionally include vent filter elements 125, similar to extract flow opening filter elements 120 described above, and may be made from similar suitable materials and by similar suitable methods to those described above in reference to filter elements 120. Optional vent filter elements 125 may also be multi-staged, comprising a plurality of individual filter elements. In an alternative such embodiment, the one or more vent openings 122 may be adjustable or configurable to control the amount of low density extractable constituents which may flow through the vent openings 122.

In another embodiment, the one or more vent openings 122 may be operable to control an amount of infusible material 4 which may pass through vent openings 122. In one example thereof, vent openings 122 may desirably substantially prevent passage of infusible material 4. In another example thereof, vent openings may be adjustable or configurable such that they are operable to controllably permit a desired amount of infusible material 4 through the vent openings 122 and into the separated extract 3 in the extract chamber 27. The passage of a controlled and typically very small amount of infusible material 4 through the vent openings 122 into separated extract 3, may be desirable in some cases, or by some users, to affect the taste of the separated extract 3, for example.

In the exemplary embodiment of the present disclosure shown in FIG. 3, the fluid chamber 116 defined by the second surface 115 is substantially open at the top and thereby permits flow of extract out of fluid chamber 116, such as through extract flow path 126, as generally indicated by arrow 128 as plunger 105 is moved through an infusing container containing a mixture of extract and infusible material, similar to as shown with plunger 5 in FIG. 2. In other exemplary embodiments, the fluid chamber 116 defined by the second surface 115 may be partially closed or narrowed at the top.

Figure 4:
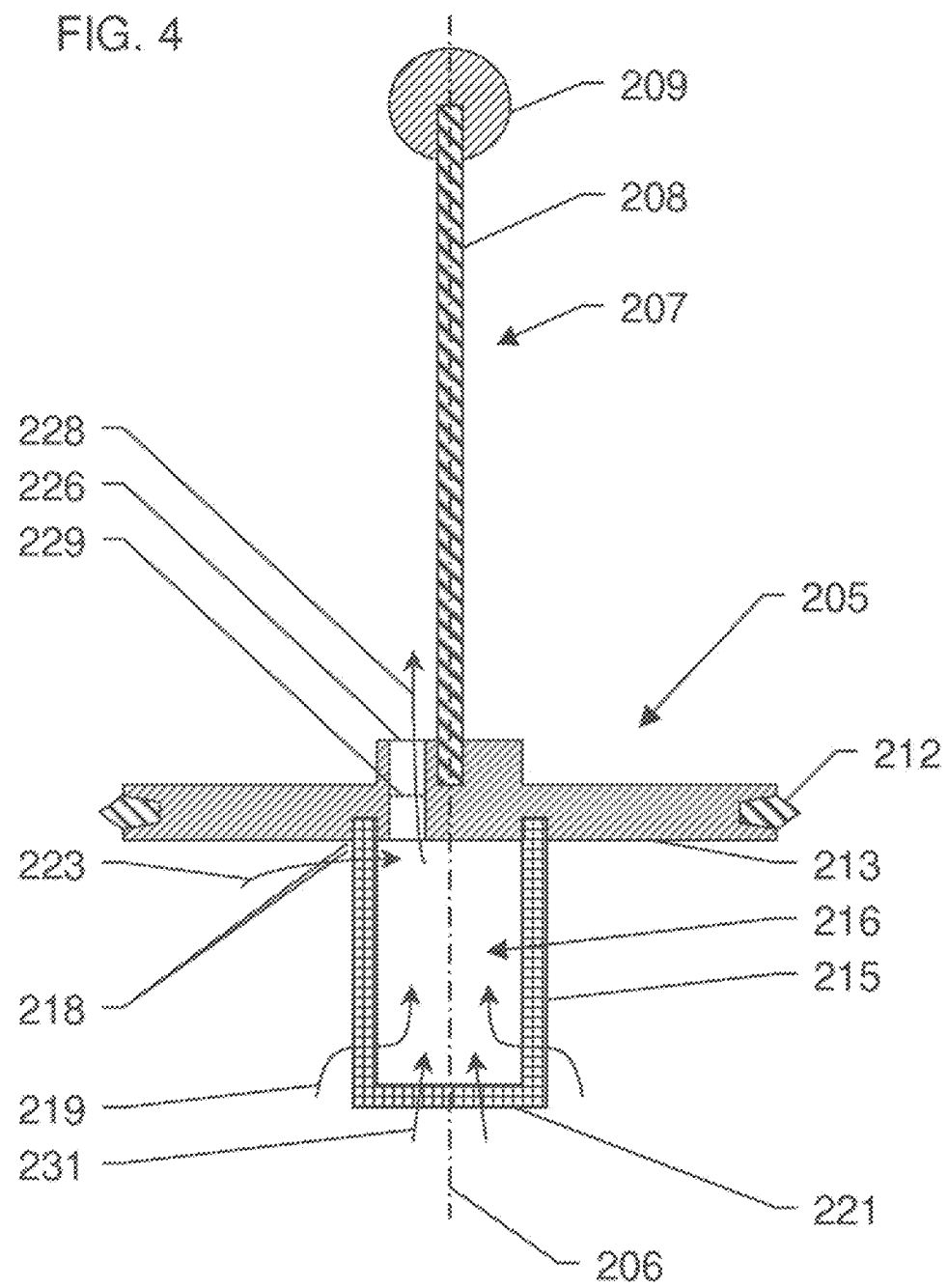
FIG. 4 depicts a vertical section of an alternative exemplary embodiment of a piston/filter plunger element including a porous wall section according to an embodiment of the disclosure.

Referring to FIG. 4, a vertical section of an exemplary embodiment of a plunger element 205 according to an embodiment of the disclosure is shown, configured similarly to a French press type coffee and/or tea making plunger. Plunger element 205 is adapted to fit within an infusing container, such as the infusing container shown in FIG. 1, and to be moved within the infusing container (not shown) along a vertical axis thereof, such as central vertical axis 206, by means such as central elongated handle 207. Handle means 207 may comprise rod 208 and optional knob 209, for example, which may be grasped by a user to move the plunger element 205.

Plunger element 205 additionally comprises sealing means 212 situated at the edge of a first surface or wall 213 of the plunger element 205, which is oriented substantially transverse to the vertical axis 206. Sealing means 212 may be essentially similar in design and construction to the sealing means 12 described above with respect to FIG. 1.

The plunger element 205 further comprises a second surface or wall 215 depending from and oriented substantially perpendicular to the first surface 213, defining a fluid chamber 216. Similar to the plunger element 5 shown in FIG. 1, the joint between the first surface 213 and the second surface 215 of plunger 205 is substantially leak proof. At least a portion of the second surface 215 of plunger element 205 comprises a porous wall section, wherein the porous wall section is permeable to the extract and comprises a plurality of extract flow apertures or openings. At least a portion of such extract flow apertures are situated at a depth 218 below the first surface 213. The portion of the second surface 215 which is porous is adapted to permit flow of extract into chamber 216 as shown by arrow 219. Preferably, such porous portion of the second surface 215 is also adapted to substantially prevent movement of infusible material into chamber 216. In one exemplary embodiment, substantially the entire length of second surface 215 may comprise such a porous wall section, permeable to the extract.

In the exemplary embodiment of the present disclosure shown in FIG. 4, at least a portion of the end wall portion 221 closing the bottom of the second surface or wall 215 also comprises a porous wall section, wherein such porous wall section of end wall 221 is permeable to the extract and comprises a plurality of apertures. In such an embodiment, the portion of the end wall portion 221 which is porous is adapted to permit flow of extract into chamber 216 as shown by arrow 231, and may also preferably be adapted to substantially prevent movement of infusible material into chamber 216.

Similar to the exemplary plunger element 5 of FIG. 1, the porous wall sections of second wall 215 and end portion 221 of plunger element 205 may be desirably adapted to control the passage of infusible material through the porous wall section to allow substantial separation of the extract from the infusible material, and optionally, apertures in the porous wall sections may be small enough to substantially exclude the infusible material from passing through the porous wall sections. The porous wall sections may be made from similar suitable materials and by similar suitable methods to those described above in reference to filter elements. Additionally, the porous wall sections may be multi-staged, comprising a plurality of individual layers of porous materials. In another embodiment, the porous wall sections may comprise a plurality of segments, wherein each segment may be more or less permeable to the extract, thereby providing porous wall sections of variable permeability to the extract. In one example of such an embodiment, porous end wall 221 may have a greater permeability to the extract than a porous wall section of second surface 215, or vice versa.

In the exemplary embodiment of the present disclosure shown in FIG. 4, the first surface 213 of plunger element 205 is substantially circular in cross-section adapted to fit inside a substantially cylindrical infusing container, and the second surface 215 is substantially cylindrical with a substantially circular cross-section, and a plug or end wall portion 221 closing the bottom of the second surface or wall 215. Sealing means 212 are essentially similar to the sealing means 12 described above with respect to FIG. 1, and are situated around the substantially circular outside edge of the first surface 213 of plunger element 205, performing the same sealing function as described above with reference to FIG. 1. In alternative embodiments of the disclosure, the infusing container and mating plunger element 205 and first surface 213 thereof may optionally have another cross-sectional shape, such as a square or rectangular or other shape for example, wherein sealing means 212 may be situated around the edge or edges of the first surface 213 of the plunger element 205. Further, in alternative embodiments, the second wall 215 of the plunger element 205 may optionally have another shape, such as a rectangular prism, or conical frustum, for example.

The plunger element 205 and first wall 213 and second wall 215 components thereof may be made from any suitable materials such as such exemplary materials described above in reference to plunger element 5 of FIG. 1.

In the exemplary embodiment shown in FIG. 4, where the porous portion of the second surface 215 extends to substantially the top of the second surface 215, as the plunger element 205 is moved inside the infusing container, the portion of the second surface 215 which is porous may also be adapted to permit the flow of any air present in the infusing container through the porous portion of the second surface 215, as represented in FIG. 4 by arrow 223. In some exemplary embodiments of the disclosure, extraction of the infusible material may also result in the extraction of low density extractable constituents, such as oils or other constituents having a lower density than the remainder of the extract, and which may typically float on top of the extract. In such embodiments comprising low density extractable constituents, the portion of the second surface 215 which is porous may also permit the flow of at least a portion of the low density extractable constituents. In an alternative such embodiment, the portion of the second surface 215 which is porous may be adjustable or configurable to control the amount of low density extractable constituents which may flow through the portion of the second surface 215 which is porous, as represented in FIG. 4 by arrow 223.

In an alternative embodiment, plunger element 205 may optionally also comprise a vent opening (not shown) in the first surface 213, to provide for the passage of air and/or at least a portion of any low density extractable constituents through the first surface 213. Such optional vent opening may be similar to vent opening 22 of FIG. 1 as described above.

In some embodiments of the disclosure, such as that shown in FIG. 4, the plunger element 205 may also include one or more extract flow paths 226 in the plunger element 205 to permit flow of extract out of chamber 216 through the flow path 226, as generally indicated by arrow 228. Extract flow path 226 may be an opening located in the first surface 213 of the plunger element 105, or more generally in the plunger element 205. The extract flow path 226 may also optionally include one or more extract flow path filter elements 229, substantially similar to filter elements 29 described above, and may be made from similar suitable materials and by similar suitable methods to those described above in reference to filter elements 29. Optional extract flow path filter elements 229 may also be multi-staged, comprising a plurality of individual filter elements.

Figure 5:
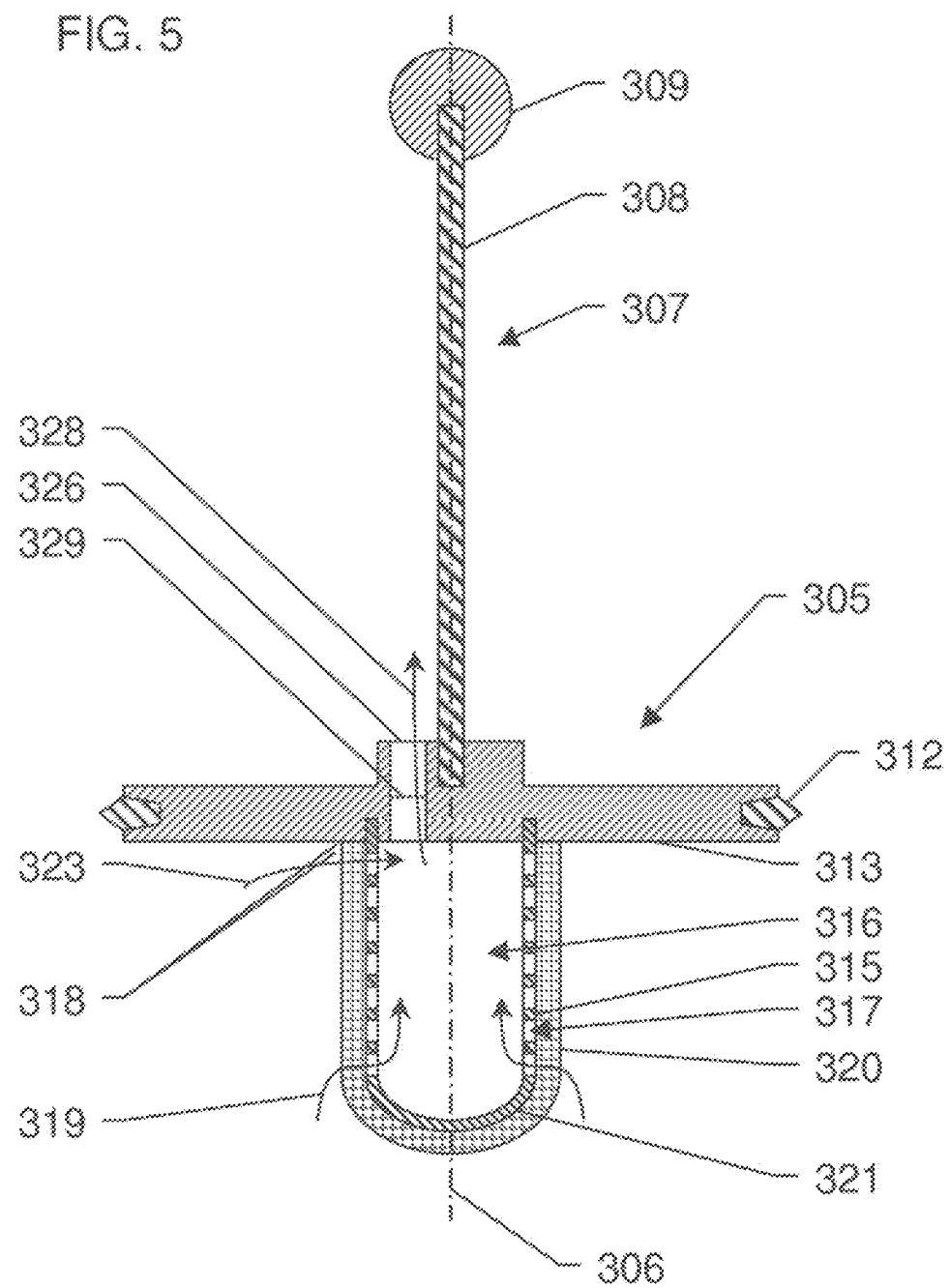
FIG. 5 depicts a vertical section of an alternative exemplary embodiment of a piston/filter plunger element including a removable filter element according to an embodiment of the disclosure.

Referring to FIG. 5, a vertical section of an exemplary embodiment of a plunger element 305 according to an embodiment of the disclosure is shown, configured similarly to a French press type coffee and/or tea making plunger. Plunger element 305 is adapted to fit within an infusing container similar to that shown in FIG. 1, and to be moved within the infusing container (not shown) along a vertical axis thereof, such as central vertical axis 306, by means such as elongated handle 307. Handle means 307 may be comprised of rod 308 and optional knob 309, for example, which may be grasped by a user to move the plunger element 305.

Exemplary plunger element 305 additionally comprises sealing means 312 situated at the edge of a first surface or wall 313 of the plunger element 305, which is substantially circular in cross-section and oriented substantially transverse to the vertical axis 306, similar to plunger 205 of FIG. 4, as described above. Further, plunger 305 includes an extract flow path opening 326, such as in first surface 313, to allow flow to pass through plunger 305, and in particular through first surface 313 of plunger 305 as shown by arrow 328. Extract flow path 326 may also optionally comprise one or more extract flow filters 329, similar to as described above in reference to plunger 205 of FIG. 4. In other alternative embodiments, plunger element 305 may comprise another cross-sectional shape to fit inside a non-cylindrical infusion container.

The plunger element 305 further comprises a substantially cylindrical second surface or wall 315 depending from and oriented substantially perpendicular to the first surface 313, with a plug or end wall portion 321 closing the bottom of the second surface or wall 315, defining a fluid chamber 316. Similar to the plunger element 5 shown in FIG. 1, the joint between the first surface 313 and the second surface 315 of plunger 305 is substantially leak proof. The second surface 315 of plunger element 305 also comprises one or more extract flow openings 317 situated at various depths separated from the first surface 313 along the central axis 306. At least a portion of such extract flow openings 317 are situated at a depth 318 below the first surface 313 along central axis 306. The one or more extract flow openings 317 are adapted to permit flow of extract into chamber 316 as shown by arrow 319. In other alternative embodiments, second surface 315 may optionally have another shape, such as a rectangular prism or conical frustum, for example. Porous sleeve 320 covers extract flow openings 317 in second surface 315, such that extract flowing through openings 317 into chamber 316 as shown by arrow 319 must substantially pass through porous sleeve 320. Porous sleeve 320 is permeable to the extract and comprises a plurality of apertures. The porous sleeve 320 may be substantially fixed to the second wall 315, or may be removable. In another embodiment, porous sleeve 320 may comprise a plurality of segments, wherein each segment may be more or less permeable to the extract, thereby providing a porous sleeve 320 of variable permeability. In one such embodiment, an upper segment of porous sleeve 320 may be more permeable to the extract relative to a lower segment of the porous sleeve 320, or vice versa, for example.

Similar to exemplary plunger element 5 of FIG. 1, the porous sleeve 320 may be desirably adapted to control the passage of infusible material through extract flow openings 317 to allow substantial separation of the extract from the infusible material, and optionally, apertures in the porous sleeve 320 may be small enough to substantially exclude the infusible material from passing through openings 317. The porous sleeve 320 may be made from similar suitable materials and by similar suitable methods to those described above in reference to filter elements 20. Additionally, the porous sleeve 320 may be multi-staged, comprising a plurality of individual layers of porous materials.

The plunger element 305 and first wall 313 and second wall 315 components thereof may be made from suitable materials such as described above in reference to plunger element 5 of FIG. 1.

As the plunger element 305 is moved inside an infusing container, the porous sleeve 320 and extract flow openings 317 are adapted to permit the flow of any air present in the infusing container through the porous sleeve 320 and the extract flow openings 317, and into chamber 316, as represented in FIG. 5 by arrow 323. In some exemplary embodiments of the disclosure, extraction of the infusible material may also result in the extraction of low density extractable constituents, such as oils or other constituents having a lower density than the remainder of the extract, and which may typically float on top of the extract. In such embodiments comprising low density extractable constituents, the porous sleeve 320 may also permit the flow of at least a portion of the low density extractable constituents. In an alternative such embodiment, the second surface 315 and/or porous sleeve 320 may be adjustable or configurable to control the amount of low density extractable constituents which may flow through the porous sleeve 320 and the extract flow openings 317, and into chamber 316, as represented in FIG. 5 by arrow 323. In an alternative embodiment, plunger element 305 may optionally also comprise a vent opening (not shown) in the first surface 313, to provide for the passage of air and/or at least a portion of any low density extractable constituents through the first surface 313. Such optional vent opening may be similar to vent opening 22 of FIG. 1 as described above.

Figure 6:
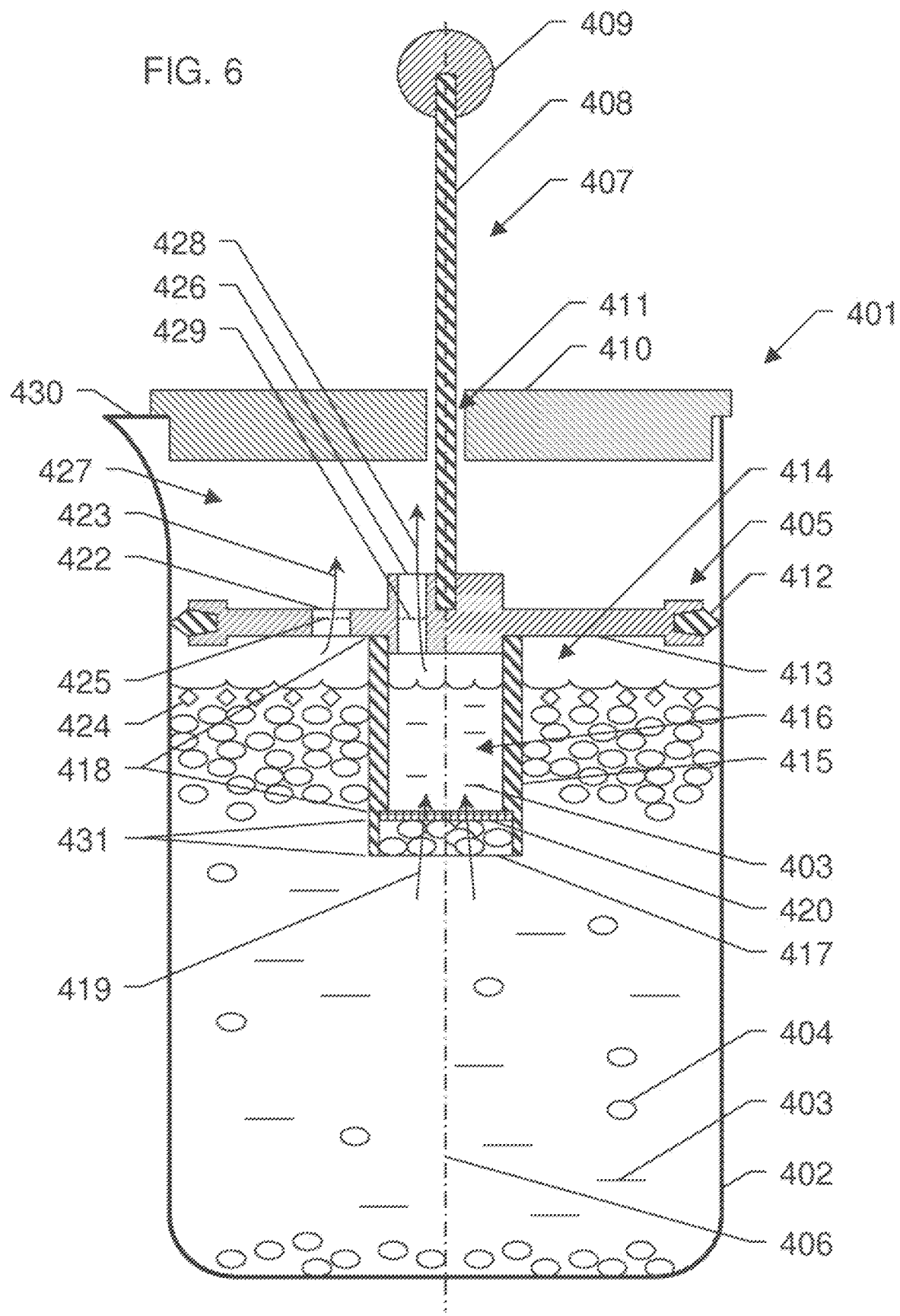
FIG. 6 depicts a vertical section of an alternative exemplary embodiment of a solvent extraction apparatus according to an embodiment of the present disclosure, including a piston/filter plunger element in a starting position.

Referring to FIG. 6, a solvent extraction apparatus 401 according to an embodiment of the disclosure is shown, configured similarly to extraction apparatus 1 of FIG. 1 as described above. The solvent extraction apparatus 401 comprises exemplary cylindrical infusing container 402 containing a mixture of extract 403 and infusible material 404. Plunger element 405 is substantially cylindrical in cross-section and adapted to fit within infusing container 402 of solvent extraction apparatus 401, and to be moved within the infusing container 402 along a vertical axis thereof, such as central vertical axis 406, by means of a plunging means attached to the plunger element 405. The plunging means may comprise a central elongated handle 407 comprised of rod 408 and optional knob 409, for example, which may be grasped by a user to move the plunger element 405. The extraction apparatus 401 may additionally comprise a lid 410 with central hole 411 through which rod 408 may pass to assist in centering the plunger element 405 and rod 408 inside infusing container 402 and prevent it from tilting.

Plunger element 405 additionally comprises sealing means 412 situated at the edge of a first surface or wall 413 of the plunger element 405, which is oriented substantially transverse to the vertical axis 406. In use inside infusing container 402, the first surface 413 and sealing means 412 of the plunger element 405 define a first chamber 414 containing the mixture of extract 403 and infusible material 404. FIG. 6 shows the extraction apparatus 401 in a first or starting position for separating the extract 403 from the mixture of extract 403 and infusible material 404 in infusing container 402. Further, plunger 405 includes an extract flow path opening 426, such as in first surface 413, to allow flow to pass through plunger 405 and in particular through first surface 413 as shown by arrow 428. Extract flow path 426 may also optionally comprise one or more extract flow filters 429, similar to as described above in reference to plunger 5 of FIG. 1. In other alternative embodiments, plunger element 405 may comprise another cross-sectional shape to fit a non-cylindrical infusion container 402.

The plunger element 405 further comprises substantially cylindrical second surface or wall 415, defining second chamber 416 containing extract 403. The second surface 415 of plunger element 405 also comprises extract flow opening 417 situated across the bottom of the second surface 415, at a depth 418 below the first surface 413 along the central axis 406. The extract flow opening 417 is adapted to permit flow of extract 403 from the first chamber 414 (containing a mixture of extract 403 and infusible material 404) to the second chamber 416 (containing extract 403) as shown by arrow 419. In other alternative embodiments, second surface 415 may optionally have another shape, such as a rectangular prism or conical frustum, for example. The extract flow opening 417 in the second wall 415 typically comprises one or more filter elements 420 within or across the extract flow opening 417, such that extract 403 flowing through the opening 417 as shown by arrow 419 must substantially pass through the filter elements 420. Similar to exemplary plunger element 5 of FIG. 1, the one or more filter elements 420 may be desirably adapted to control the passage of infusible material 404 through the openings 417 to allow substantial separation of the extract 403 from the infusible material 404, and optionally, apertures in the filter elements 420 may be small enough to substantially exclude the infusible material 404 from passing through the openings 417. Extract flow path filter elements 420 are substantially similar to extract flow opening filter elements 20 described above, and may be made from similar suitable materials and by similar suitable methods to those described above in reference to filter elements 20.

The second surface 415 may optionally extend below filter element 420, as shown in FIG. 6 by depth 431. If so, some of the infusible material 403 may be captured in the opening of the second wall 415 below filter 420, as plunger 405 is moved through the mixture of extract 403 and infusible material 404. This infusible material may desirably form a "filter cake," which may further prevent small particles of the infusible material 404 from passing into chamber 416.

The infusing container 402 may be made from suitable materials such as described above in reference to infusing container 2 of FIG. 1. Additionally, the infusing container 402 may optionally include a double-layered wall, with a vacuum or other suitable and preferably insulative substance between the two walls of the infusing container 402, such as described above in reference to infusing container 2 of FIG. 1. The infusing container 402 may also optionally include a pouring spout 430, which may be used to pour the separated extract 403 from the third chamber 427 for consumption or other use. The plunger element 405 and first wall 413 and second wall 415 components thereof may be made from suitable materials such as described above in reference to plunger element 5 of FIG. 1.

As in plunger element 5, plunger element 405 may typically also include one or more vent openings 422 adapted to permit the flow of air and/or a portion of any low density extractable constituents 424 through the vent openings 422, as represented in FIG. 6 by arrow 423, as the plunger element 405 is moved inside the infusing container 402. Vent openings 422 may also optionally include vent filter elements 425, similar to extract flow opening filter elements described above, and may be made from similar suitable materials and by similar suitable methods to those described above in reference to filter elements 20.

Figure 7:
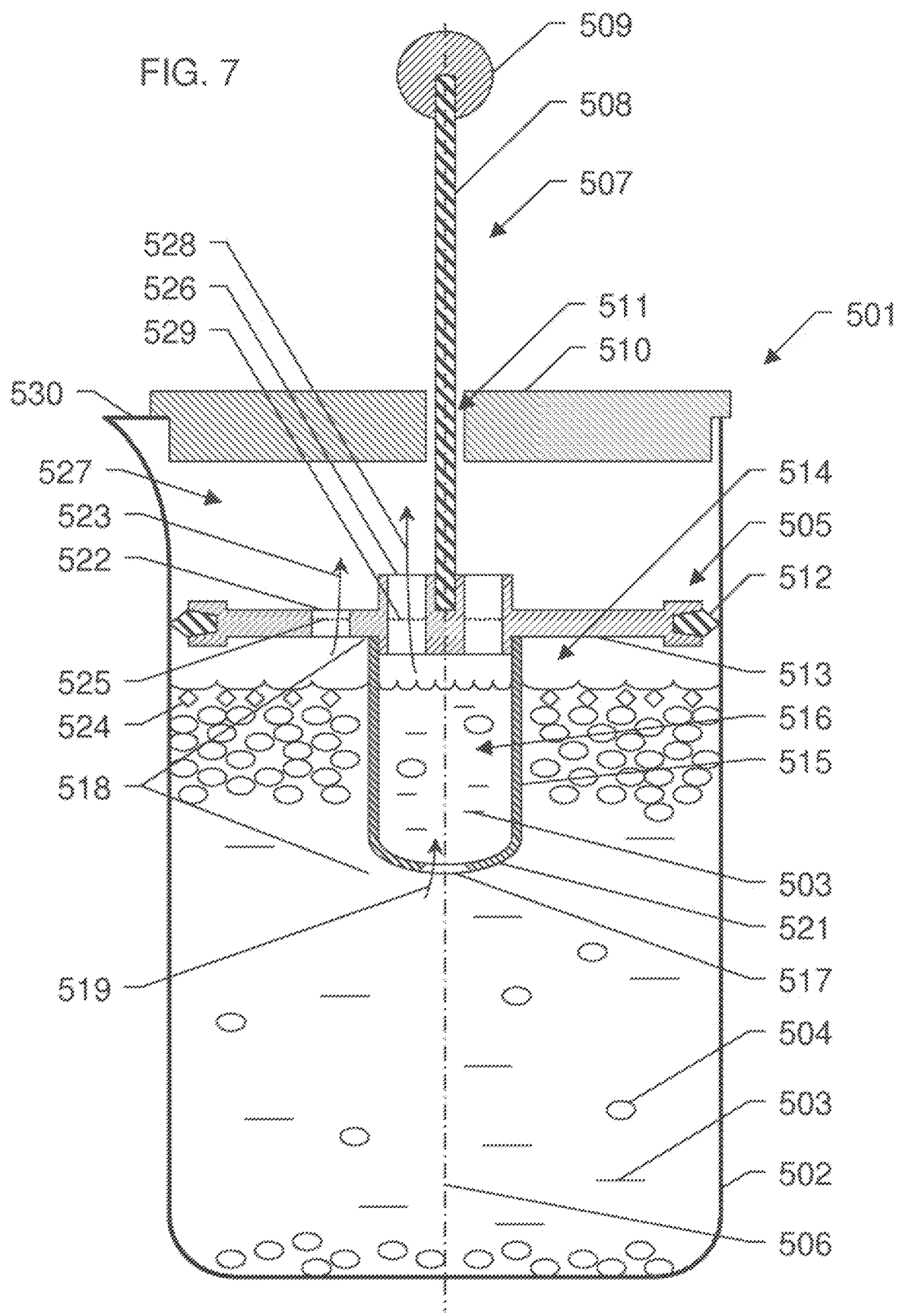
FIG. 7 depicts a vertical section of a further alternative exemplary embodiment of a solvent extraction apparatus according to an embodiment of the present disclosure, including a piston/filter plunger element in a starting position.

Referring to FIG. 7, a solvent extraction apparatus 501 according to an embodiment of the disclosure is shown, configured similarly to the extraction apparatus 1 of FIG. 1. The solvent extraction apparatus 501 comprises exemplary cylindrical infusing container 502 containing a mixture of extract 503 and infusible material 504. Plunger element 505 is substantially circular in cross-section and adapted to fit within infusing container 502 of solvent extraction apparatus 501, and to be moved within the infusing container 502 along a vertical axis thereof, such as central vertical axis 506, by means of a plunging means attached to the plunger element 505. The plunging means may comprise a central elongated handle 507 comprising rod 508 and optional knob 509, for example, which may be grasped by a user to move the plunger element 505. The extraction apparatus 501 may additionally comprise a lid 510 with central hole 511 through which rod 508 may pass to assist in centering the plunger element 505 and rod 508 inside infusing container 502 and prevent it from tilting.

Plunger element 505 additionally comprises sealing means 512 situated at the edge of a first surface or wall 513 of the plunger element 505, which is oriented substantially transverse to the vertical axis 506. In use inside infusing container 502, the first surface 513 and sealing means 512 of the plunger element 505 define a first chamber 514 containing the mixture of extract 503 and infusible material 504. FIG. 7 shows the extraction apparatus 501 in a first or starting position for separating the extract 503 from the mixture of extract 503 and infusible material 504 in infusing container 502. Further, plunger 505 includes at least one extract flow path opening 526, such as in first surface 513, to allow flow to pass through the plunger element 505, and particularly through first surface 513 as shown by arrow 528. Extract flow path 526 may also optionally comprise one or more extract flow filters 529, similar to as described above in reference to plunger 5 of FIG. 1. In other alternative embodiments, plunger element 505 may comprise another cross-sectional shape to fit a non-cylindrical infusion container 502.

The plunger element 505 further comprises a substantially cylindrical second surface or wall 515 with a plug or end wall portion 521 located at the bottom of the second surface or wall 515, defining second chamber 516 containing extract 503 and typically also a relatively small portion of infusible material 504. The bottom plug section 521 of second surface 515 comprises extract flow opening 517 situated at a depth 518 below the first surface 513 along the vertical axis 506. Due to the relatively small area of opening 517 relative to the cross-sectional area of the infusing container 502, the extract flow opening 517 is adapted to permit flow of extract 503 and a relatively small portion of the total infusible material 504 from the first chamber 514 to the second chamber 516 as shown by arrow 519. In alternative embodiments, the relative size of extract flow opening 517 may be varied in order to vary the relative amount of infusible material 504 allowed to enter second chamber 516. Further, in alternative embodiments, the second wall 515 of the plunger element 505 may optionally have another shape, such as a rectangular prism, or conical frustum, for example.

The plunger element 505 and first wall 513 and second wall 515 components thereof may be made from suitable materials such as described above in reference to plunger element 5 of FIG. 1. The infusing container 502 may be made from suitable materials such as described above in reference to infusing container 2 of FIG. 1 and container 402 of FIG. 6. The infusing container 502 may also optionally include a pouring spout 530, which may be used to pour the separated extract 503 from the third chamber 527 for consumption or other use. The infusing container 502 may further optionally include a handle (not shown) to facilitate lifting or moving the extraction apparatus 501 by a user.

As in plunger element 5, plunger element 505 may typically also include one or more vent openings 522 adapted to permit the flow of air and/or a portion of any low density extractable constituents 524 through the vent openings 522, as represented in FIG. 7 by arrow 523, as the plunger element 505 is moved inside the infusing container 502. Vent openings 522 may also optionally include vent filter elements 525, similar to extract flow opening filter elements 20 described above, and may be made from similar suitable materials and by similar suitable methods to those described above in reference to filter elements 20.

Referring to FIG. 8, a solvent extraction apparatus 601 according to an embodiment of the disclosure is shown, configured similarly to a French press type coffee or tea making apparatus. The solvent extraction apparatus 601 comprises exemplary walled cylinder infusing container 602 containing a mixture of extract 603 and infusible material 604. Plunger element 605 is adapted to fit within infusing container 602 of solvent extraction apparatus 601, and to be moved within the infusing container 602 along a vertical axis thereof, such as central vertical axis 606, by means of a plunging means attached to the plunger element 605. The plunging means may comprise a central elongated handle 607 comprised of rod 608 and optional knob 609, for example, which may be grasped by a user to move the plunger element 605. The extraction apparatus 601 may additionally comprise a lid 610 with central hole 611 through which rod 608 may pass to assist in centering the plunger element 605 and rod 608 inside infusing container 602 and prevent it from tilting. FIG. 8 shows the extraction apparatus 601 in a first or starting position for separating the extract 603 from the mixture of extract 603 and infusible material 604 in infusing container 602.

Plunger element 605 additionally comprises sealing means 612 situated at the edge of a first surface or wall 613 of the plunger element 605, which is substantially circular in cross-section and is oriented substantially transverse to the vertical axis 606. In use inside infusing container 602, the first surface 613 and sealing means 612 of the plunger element 605 define a first chamber 614 containing the mixture of extract 603 and infusible material 604. Sealing means 612 are essentially similar to the sealing means 12 described above with respect to FIG. 1, and are situated around the substantially circular outside edge of the first surface 613 of plunger element 605, performing the same sealing function as described above with reference to FIG. 1. In alternative embodiments of the disclosure, the infusing container 602 and mating plunger element 605 and first surface 613 thereof may optionally have another cross-sectional shape, such as a square or rectangular or other shape for example, wherein sealing means 612 may be situated around the edge or edges of the first surface 613 of the plunger element 605.

The plunger element 605 further comprises a substantially cylindrical second surface or wall 615 depending from and oriented substantially perpendicular to the first surface 613, defining a second substantially annular chamber 616 containing extract 603. The joint between the first surface 613 and the second surface 615 is substantially leak proof with respect to extract 603 and infusible material 604. Second surface 615 of plunger element 605 comprises plug or top wall portion 621 closing the top of the second surface or wall 615. The second surface 615 of plunger element 605 also comprises one or more extract flow openings 617, at least a portion of which are situated at a depth 618 separated from the first surface 613 along the vertical axis 606. The one or more extract flow openings 617 are adapted to permit flow of extract 603 from the first chamber 614 (containing a mixture of extract 603 and infusible material 604) to the second annular chamber 616 (containing extract 603) as shown by arrow 619. In alternative embodiments, the second wall 615 of the plunger element 605 may optionally have another shape, such as a rectangular prism, or conical frustum, for example.

In the exemplary embodiment of the present disclosure shown in FIG. 8. The extract flow openings 617 in the second wall 615 are desirably adapted to control the passage of infusible material 604 through the openings 617 to allow substantial separation of the extract 603 from the infusible material 604, and optionally, extract flow openings 617 in the second wall 615 may be sufficiently small to substantially exclude the infusible material 604 from passing through the openings 617. Extract flow openings 617 may also optionally comprise one or more filter elements, similar to filter elements 20 in FIG. 1 described above.

In some embodiments of the disclosure, such as that shown in FIG. 8, the plunger element 605 may also include one or more extract flow paths 626 in the plunger element 605 to permit flow of extract 603 from the annular second chamber 616 to a third extract chamber 627 through the flow path 626, as generally indicated by arrow 628.

As in plunger element 5, plunger element 605 may typically also include one or more vent openings 622 adapted to permit the flow of air and/or a portion of any low density extractable constituents 624 through the vent openings 622, as represented in FIG. 8 by arrow 623, as the plunger element 605 is moved inside the infusing container 602. In the exemplary embodiment of the present disclosure shown in FIG. 8, the vent openings 622 in the second wall 615 are desirably adapted to control the passage of infusible material 604 through the vent openings 622, and optionally, vent openings 622 in the second wall 615 may be sufficiently small to substantially exclude the infusible material 604 from passing through the vent openings 622. In alternative embodiments, vent openings 622 may also optionally include vent filter elements (not shown), similar to filter elements 20 described above, and may be made from similar suitable materials and by similar suitable methods to those described above in reference to filter elements 20. In a further alternative embodiment, the one or more vent openings 622 may be adjustable or configurable to control the amount of low density extractable constituents 624 which may flow through the vent openings 622.

The plunger element 605 and first wall 613 and second wall 615 components thereof may be made from suitable materials such as described above in reference to plunger element 5 of FIG. 1. The infusing container 602 may be made from suitable materials such as described above in reference to infusing container 2 of FIG. 1, and infusing container 402 of FIG. 6. The infusing container 602 may also optionally include a pouring spout 630, which may be used to pour the separated extract 603 from the third chamber 627 for consumption or other use. The infusing container 602 may further optionally include a handle (not shown) to facilitate lifting or moving the extraction apparatus 601 by a user.

Referring to FIG. 9, a solvent extraction apparatus 701 according to an embodiment of the disclosure is shown, configured similarly to a reverse French press type extraction apparatus, wherein infusible material may be lifted out of an infusing container, rather than pressed to the bottom of the container. The solvent extraction apparatus 701 comprises exemplary cylindrical infusing container 702 containing a mixture of extract 703 and infusible material 704. Plunger element 705 is substantially cylindrical in cross-section and adapted to fit within infusing container 702 of solvent extraction apparatus 701, and to be moved within the infusing container 702 from the bottom to the top of the container 702, along a vertical axis thereof, such as central vertical axis 706, by means of lifting a plunging means attached to the plunger element 705. The plunging means may comprise a central elongated handle 707 comprised of rod 708 and optional knob 709, for example, which may be grasped by a user to lift the plunger element 705 in the direction shown by arrow 732. The extraction apparatus 701 additionally comprises a lid 710 with central hole 711 through which rod 708 may pass to assist in centering the plunger element 705 and rod 708 inside infusing container 702 and prevent it from tilting. Lid 710 also comprises an interior cavity or opening, such that the infusible material may be lifted into the lid 710 by lifting plunger 705. FIG. 9 shows the extraction apparatus 701 in a first or starting position for separating the extract 703 from the mixture of extract 703 and infusible material 704 in infusing container 702.

Plunger element 705 additionally comprises sealing means 712 situated at the edge of a first surface or wall 713 of the plunger element 705, which is oriented substantially transverse to the vertical axis 706. In use inside infusing container 702, the first surface 713 and sealing means 712 of the plunger element 705 define a first chamber 714 containing the mixture of extract 703 and infusible material 704. In other alternative embodiments, plunger element 705 may comprise another cross-sectional shape to fit a non-cylindrical infusion container 702, wherein sealing means 712 may be situated around the edge or edges of the first surface 713 of the plunger element 705.

The plunger element 705 further comprises a second surface or wall 715 depending from and oriented substantially perpendicular to the first surface 713, defining a second fluid chamber 716, which is substantially open at one end. Similar to the plunger element 5 shown in FIG. 1, the joint between the first surface 713 and the second surface 715 of plunger 705 is substantially leak proof, and the second surface 715 of plunger element 705 also comprises one or more extract flow openings 717, wherein at least a portion of the one of more extract flow openings 717 is situated at a depth 718 above the first surface 713 along the vertical axis 706. The one or more extract flow openings 717 are adapted to permit flow of extract into second chamber 716 as shown by arrow 719. In the exemplary embodiment of the present disclosure shown in FIG. 9, the second surface 715 is substantially cylindrical with a substantially circular cross-section, and with a plug or end wall portion 721 closing the top of the second surface or wall 715. In alternative embodiments, the second surface or wall 715 of the plunger element 705 may optionally have another shape, such as a rectangular prism, or conical frustum, for example.

The one or more extract flow openings 717 in the second wall 715 typically comprise one or more filter elements 720 within or across the extract flow openings 717, such that extract flowing through the openings 717 as shown by arrow 719 must substantially pass through the filter elements 720. Similar to exemplary plunger element 5 of FIG. 1, the one or more filter elements 720 may be desirably adapted to control the passage of infusible material through the openings 717 to allow substantial separation of the extract from the infusible material, and optionally, apertures in the filter elements 720 may be small enough to substantially exclude the infusible material from passing through the openings 717. Extract flow path filter elements 720 are substantially similar to extract flow opening filter elements 20 described above, and may be made from similar suitable materials and by similar suitable methods to those described above in reference to filter elements 20.

In the exemplary embodiment of the present disclosure shown in FIG. 9, the second fluid chamber 716 defined by the second surface 715 has a substantially open extract flow opening 726 at the bottom and thereby permits flow of extract out of fluid chamber 716, as generally indicated by arrow 728 as plunger 705 is lifted up through the infusing container 702. In other exemplary embodiments, the fluid chamber 716 defined by the second surface 715 may be partially closed or narrowed at an extract flow opening 726 located at the bottom of chamber 716. In a further alternative embodiment, the fluid chamber 716 may be closed at the bottom, and may comprise an extract flow path (not shown) through first surface 713, to allow the flow of extract 703 into a third fluid chamber 727.

The infusing container 702 may be made from suitable materials, and in such a manner as described above in reference to infusing container 2 of FIG. 1. The infusing container 702 may also typically include a pouring spout 730, which may be used to pour the separated extract 703 from the third chamber 727 for consumption or other use. The plunger element 705 and first wall 713 and second wall 715 components thereof may be made from suitable materials such as described above in reference to plunger element 5 of FIG. 1.

Referring to FIG. 10, a vertical section of an exemplary embodiment of a plunger element 805 according to an embodiment of the disclosure is shown, configured similarly to a French press type coffee and/or tea making plunger. Plunger element 805 is adapted to fit within an infusing container, such as the infusing container shown in FIG. 1, and to be moved within the infusing container (not shown) along a vertical axis thereof, such as central vertical axis 806, by means such as central elongated handle 807. Handle means 807 may comprise rod 808 and optional knob 809, for example, which may be grasped by a user to move the plunger element 805.

Plunger element 805 additionally comprises sealing means 812 situated at the edge of a first surface or wall 813 of the plunger element 805, which is substantially circular in cross-section, and is oriented substantially transverse to the vertical axis 806. Sealing means 812 may be essentially similar in design and construction to the sealing means 12 described above with respect to FIG. 1. Further, plunger 805 includes at least one extract flow path opening 826, such as in first surface 813, to allow flow to pass through plunger 805, and in particular through first surface 813 as shown by arrow 828. Extract flow path 826 may also optionally comprise one or more extract flow filters 829, which may be essentially similar to filter elements 20 as described above in reference to FIG. 1. In other alternative embodiments, plunger element 805 may comprise another cross-sectional shape to fit inside a non-cylindrical infusion container.

The plunger element 805 further comprises a substantially cylindrical second surface or wall 815 depending from and oriented substantially perpendicular to the first surface 813, with a plug or end wall portion 821 closing the bottom of the second surface or wall 815, defining a second fluid chamber 816. Similar to the plunger element 5 shown in FIG. 1, the joint between the first surface 813 and the second surface 815 of plunger 805 is substantially leak proof. The second surface 815 of plunger element 805 also comprises one or more extract flow openings 817, wherein at least a portion of the one or more extract flow openings 817 is situated at a depth 818 below the first surface 813 along the vertical axis 806. The one or more extract flow openings 817 are adapted to permit flow of extract into chamber 816 as shown by arrow 819. In other alternative embodiments, second surface 815 may optionally have another shape, such as a rectangular prism or conical frustum, for example.

The one or more extract flow openings 817 in the second wall 815 typically comprise one or more filter elements 820 within or across the extract flow openings 817, such that extract flowing through the openings 817 as shown by arrow 819 must substantially pass through the filter elements 820. Similar to exemplary plunger element 5 of FIG. 1, the one or more filter elements 820 may be desirably adapted to control the passage of infusible material through the openings 817 to allow substantial separation of the extract from the infusible material, and optionally, apertures in the filter elements 820 may be small enough to substantially exclude the infusible material from passing through the openings 817. Extract flow path filter elements 820 are substantially similar to extract flow opening filter elements 20 described above, and may be made from similar suitable materials and by similar suitable methods to those described above in reference to filter elements 20.

The plunger 805 also comprises an adjustment means adapted to allow the adjustment of the effective depth 818 of the one or more extract flow openings 817 relative to the first surface 813, such as exemplary threaded adjustment screw 833 shown in FIG. 10. The adjustment screw 833 is adapted to adjust the effective length of second surface or wall 815 extending below first surface 813 by means of rotating the adjustment screw 833, and by so doing to adjust the depth 818 of the one or more extract flow openings 817 below the first surface 813. Such adjustment of the depth 818 of extract flow openings 817 may be used to desirably control the passage of infusible material into fluid chamber 816 during use of the plunger 805 in the extraction apparatus.

As in plunger element 5, plunger element 805 may typically also include one or more vent openings 822 adapted to permit the flow of air and/or a portion of any low density extractable constituents through the vent openings 822, as represented in FIG. 10 by arrow 823, as the plunger element 805 is moved inside an infusing container. Vent openings 822 may also optionally include vent filter elements 825, similar to extract flow opening filter elements 20 described above, and may be made from similar suitable materials and by similar suitable methods to those described above in reference to filter elements 20.

Referring now to FIG. 11, a vertical section of an exemplary embodiment of a plunger element 905 according to an embodiment of the disclosure is shown, configured similarly to a French press type coffee and/or tea making plunger. Similar to plunger 805 as described above, plunger element 905 is adapted to fit within an infusing container, and to be moved within the infusing container (not shown) along a vertical axis thereof, such as central vertical axis 906, by means such as central elongated handle 907, which may comprise rod 908 and optional knob 909, for example, which may be grasped by a user to move the plunger element 905.

Also similar to plunger 805 above, plunger 905 comprises a first surface or wall 913 which is substantially circular in cross-section, and is oriented substantially transverse to the vertical axis 906, with sealing means 912 situated around the edge thereof. Sealing means 912 may be essentially similar in design and construction to the sealing means 12 described above with respect to FIG. 1. Further, plunger 905 includes at least one extract flow path opening 926, such as in first surface 913, to allow flow to pass through the plunger 905, and particularly through first surface 913 as shown by arrow 928, and may also optionally comprise one or more extract flow filters 929 in opening 926, which may be essentially similar to filter elements 20 as described above in reference to FIG. 1. In other alternative embodiments, plunger element 905 may comprise another cross-sectional shape to fit inside a non-cylindrical infusion container.

As in plunger 805 above, plunger 905 further comprises a substantially cylindrical second surface or wall 915 depending from first surface 913, with a plug or end wall portion 921 closing the bottom of the second surface or wall 915, defining a second fluid chamber 916. The second surface 915 of plunger element 905 also comprises one or more extract flow openings 917 adapted to permit flow of extract into chamber 916 as shown by arrow 919, wherein at least a portion of the one or more extract flow openings 917 is situated at a depth 918 below the first surface 913 along the vertical axis 906. In other alternative embodiments, second surface 915 may optionally have another shape, such as a rectangular prism or conical frustum, for example.

Similar to plunger 805, extract flow openings 917 in the second wall 915 typically comprise one or more filter elements 920 within or across the extract flow openings 917. Similar to exemplary plunger element 5 of FIG. 1, the one or more filter elements 920 may be desirably adapted to control the passage of infusible material through the openings 917 to allow substantial separation of the extract from the infusible material, and optionally, apertures in the filter elements 920 may be small enough to substantially exclude the infusible material from passing through the openings 917. Extract flow path filter elements 920 are substantially similar to extract flow opening filter elements 20 described above, and may be made from similar suitable materials and by similar suitable methods to those described above in reference to filter elements 20.

Plunger element 905 also includes one or more vent openings 922 adapted to permit the flow of air and/or a portion of any low density extractable constituents through the vent openings 922, as represented in FIG. 11 by arrow 923, as the plunger element 905 is moved inside an infusing container. Vent openings 922 may also optionally include vent filter elements 925, similar to extract flow opening filter elements 20 described above, and may be made from similar suitable materials and by similar suitable methods to those described above in reference to filter elements 20.

The plunger 905 also comprises an adjustment means adapted to allow the adjustment of the effective opening size of the one or more vent openings 922 in the first surface 913 of the plunger 905, such as exemplary adjustable aperture slider 934 shown in FIG. 11. The adjustable aperture slider 934 is adapted to cover an adjustable portion of the one or more vent openings 922, to allow the adjustment of the effective size of the vent openings 922. Adjustable aperture slider 934 may be moved, such as radially towards or away from the central axis 906, to increase or decrease the open size of the vent openings 922, to desirably control the passage of low density extractable constituents through the first surface 913 and into the separated extract during use of the plunger 905 in the extraction apparatus. The adjustable aperture slider 934 may also be used to desirably provide additional control of the quantity (if any) of infusible material passing through vent openings 922 and into the separated extract during use of the plunger 905 in the extraction apparatus.

In a further embodiment of the disclosure, a plunger element according to the disclosure, and similar to plunger elements 805 and/or 905 illustrated and described above, may be adapted to allow a user of the disclosed embodiment to actively control the flow of extract through the plunger in use. In such an embodiment the plunger may comprise one or more of: extract flow openings, vent openings and extract flow path openings (similar to openings 917, 922 and 926 above, respectively) which may be adjustable by the user before or during use of the plunger to control the flow of extract through the openings while pressing the plunger through the mixture of extract and infusible material. Such adjustable openings may be controlled by the user to vary the size of the openings (such as with adjustable aperture slider 934 above), the location or depth of the openings relative to the plunger (such as with adjustment screw 833 described above), or to otherwise control the flow of extract through the openings in the plunger. The user may similarly actively control the passage of any infusible material through the openings in the plunger, to allow the user to substantially prevent or controllably allow passage of a portion of infusible material through the plunger. Further, the user may also similarly actively control the flow of any low-density constituents through the vent openings in the plunger during use. In such an embodiment, the plunger may also be adapted to allow the user to actively control the flow of extract, and optionally also of low density constituents and/or infusible material through the plunger during use by means of interchangeable or replaceable filter elements (similar to filter elements 920, 925 and 929 described above, for example) comprised in one of more of the extract flow openings, vent openings and extract flow path openings of the plunger. In such a case, the user may actively control the flow of one or more of: extract, low density constituent and infusible material, by interchanging or replacing one or more such filter elements with replacement elements having varying filtration and flow characteristics. It may be understood by a person skilled in the art that any of the additional plunger apparatus features described above in reference to other embodiments of the disclosure may also be applied to the present embodiment as may be suitable or desired.

In an alternative embodiment of the inventive extract separation apparatus, a plunger element adapted to fit and move along a vertical axis within an infusing container according to the disclosure may comprise a first surface comprising sealing means at an edge of the first surface adapted to seal against the inside walls of the infusing container. In such an embodiment, the first surface is oriented at an oblique angle relative to the vertical axis and is adapted to contact the inside walls of the infusing container at an oblique angle, in contrast to embodiments described above where the first surface is substantially perpendicular to the infusing container walls and vertical axis. In such alternative embodiment, at least a portion of the obliquely angled first surface of the plunger may comprise one or more extract flow openings, such that when the plunger is in use within the infusing container, a first portion of the one or more extract flow openings is located at a depth along the vertical axis below a second portion of the one of more extract flow openings. In an exemplary such alternative embodiment adapted for use in an infusing container having cylindrical walls, the obliquely angled first surface of the plunger may comprise a substantially oval disc, angled relative to the vertical axis of the infusing container. It may be understood by a person skilled in the art that any of the additional plunger apparatus features described above in reference to other embodiments of the disclosure may also be applied to the present embodiment as may be suitable or desired.

In a second alternative embodiment of the inventive extract separation apparatus, a plunger adapted to fit and move along a vertical axis within an infusing container according to the disclosure may comprise a curved, or substantially non-planar, first surface. The first surface may comprise sealing means at an edge of the first surface adapted to seal against the inside walls of the infusing container. In such an embodiment, the curved first surface comprises first and second segments, each having one or more extract flow openings therein, such that when the plunger is in use within the infusing container, the one or more extract flow openings in the first segment are located at a depth along the vertical axis below the one or more extract flow openings in the second segment of the first surface. In an exemplary such alternative embodiment, the curved first surface of the plunger element is substantially "Z" shaped in a cross-sectional view parallel to the vertical axis, such that one end of the "Z" comprises a first segment, and the other end of the "Z" comprises a second segment, at a depth above the first segment relative to the vertical axis. It may be understood by a person skilled in the art that any of the additional plunger apparatus features described above in reference to other embodiments of the disclosure may also be applied to the present embodiment as may be suitable or desired.

In yet a further alternative embodiment, an extract separation apparatus according to the disclosure may comprise an infusing container with a vertical axis and including a fixed filter element within the container, where the filter element comprises a first surface substantially transverse to a vertical axis of the container and defining a first chamber containing a mixture of extract and infusible material. The fixed filter element also comprises a second surface extending substantially perpendicular to the first surface, the second surface comprising one or more extract flow openings, wherein the one or more extract flow openings are adapted to permit flow of extract from the first chamber into the second chamber, and wherein at least a portion of the one or more extract flow openings in the second surface are situated at a depth, separated from the first surface, either above or below the first surface along the vertical axis of the infusing container. The extract separation apparatus also includes a piston element adapted to fit and move within the infusing container along the vertical axis, and to seal against the inside walls of the infusing container, such that when the first chamber of the infusing container contains a mixture of extract and infusible material, the movement of the piston element within the container forces at least a portion of the extract to flow through the extract flow openings. Depending on the orientation of the second surface of the fixed filter element either above or below the first surface, the piston element may be adapted to fit and move within the infusing container either above or below the filter element, to cause the extract to flow through the extract flow openings. In an exemplary embodiment, the piston element may be operated by a user's hand, or alternatively, may be operated mechanically, pneumatically, or by other suitable means, and may be controlled directly by a user, or by a machine. In a further exemplary embodiment, the piston element may seal a portion of air or other gas within the infusing container, between the fluid mixture and the filter element, such that the movement of the piston element exerts force on the fluid mixture indirectly through the air or other gas, to cause the extract to flow through the extract flow openings. It may be understood by a person skilled in the art that any of the additional separation apparatus features described above in reference to other embodiments of the disclosure may also be applied to the present embodiment as may be suitable or desired.

In another embodiment of the present disclosure, an inventive method of separating an extract from a mixture of the extract and an infusible material using an extract separation apparatus according to the disclosure may be provided. In such a method, a mixture of an infusible material and an extract may be mixed in an infusing container. Then a plunger element according to the disclosure may be inserted into the infusing container along a vertical axis thereof, where the plunger element comprises: wherein the plunger element comprises:
- a plunging means adapted to move the plunger element within the infusing container along the vertical axis thereof;
- a first surface substantially transverse to the vertical axis and comprising sealing means situated at one or more edges of said first surface, wherein said sealing means are adapted for sealing engagement with the one or more inner walls of the infusing container as the plunger element is moved within the container, to define a first chamber containing the mixture of infusible material and extract bounded by said first surface;
- a second surface substantially perpendicular to said first surface and defining a second chamber, said second surface comprising one or more extract flow openings, wherein said one or more extract flow openings are adapted to permit flow of extract from said first chamber into said second chamber, and wherein at least a portion of said one or more extract flow openings in said second surface are situated at a depth, wherein said depth is separated from said first surface, either above or below said first surface along the vertical axis.

Then, the plunger element may be moved within the infusing container to cause at least a portion of the extract to flow through the one or more extract flow openings, to produce a separated extract portion.

The exemplary embodiments herein described are not intended to be exhaustive or to limit the scope of the invention to the precise forms disclosed. They are chosen and described to explain the principles of the invention and its application and practical use to allow others skilled in the art to comprehend its teachings.

As will be apparent to those skilled in the art in light of the foregoing disclosure, many alterations and modifications are possible in the practice of the invention without departing from the spirit or scope thereof. Accordingly, the scope of the invention is to be construed in accordance with the substance defined by the following claims.

What is claimed is:

1. An apparatus for creating and separating an infused extract from a mixture of an infusible material and the extract, the apparatus comprising:
- a container having one or more vertical inner walls oriented parallel to a vertical axis of the container; and
- a plunger adapted to be inserted into the container, wherein the plunger is adapted to be moved within the container along the vertical axis thereof, wherein the plunger in turn includes:
  - a handle adapted to move the plunger within the container along the vertical axis thereof;
  - a first wall transverse to the vertical axis and defining a first plurality of extract flow openings therethrough formed through a first planar filter element oriented along a direction transverse to the vertical axis, wherein at least one peripheral seal is coupled to the first wall at one or more edges of the first wall, wherein the at least one peripheral seal is adapted for sealing engagement with the one or more vertical inner walls of the container as the plunger is moved within the container; and
  - a second wall transverse to the vertical axis and including a second plurality of extract flow openings therethrough formed through a second planar filter element oriented along a direction transverse to the vertical axis, the second wall being spaced downwardly from the first wall along the vertical axis, wherein the first wall, the peripheral seal, and the second wall cooperate to divide a volume of the container into a lower reservoir for receiving a mixture of infusible material and extract, an upper reservoir for receiving extract separated from the infusible material, and a chamber located between the first wall and the second wall to accommodate extract separated from the infusible material that has passed through the second plurality of extract flow openings prior to passing through the first plurality of extract flow openings; and
    - wherein extract flows from the lower reservoir, through the second plurality of extract flow openings, through the chamber, and through the first plurality of extract flow openings as the plunger is pushed downwardly.

2. The apparatus of claim 1, wherein each of the first wall and the second wall is circular in shape.

3. The apparatus of claim 1, wherein each of the first planar filter element and the second planar filter element includes a mesh defining a plurality of apertures therethrough.

4. The apparatus of claim 1, wherein each of the first planar filter element and the second planar filter element includes a screen defining a plurality of apertures therein.

5. The apparatus of claim 1, wherein each of the first planar filter element and the second planar filter element includes a polymeric material.

6. The apparatus of claim 1, wherein at least one of the first planar filter element and the second planar filter element comprises a multi-stage filter element formed from a plurality of individual filter elements.

7. An apparatus for creating and separating an infused extract from a mixture of an infusible material and the extract, the apparatus comprising:
- a container having one or more vertical inner walls oriented parallel to a vertical axis of the container; and
- a plunger adapted to be inserted into the container, wherein the plunger is adapted to be moved within the container along the vertical axis thereof, wherein the plunger in turn includes:
  - a handle adapted to move the plunger within the container along the vertical axis thereof;
  - a first wall transverse to the vertical axis and defining a first plurality of extract flow openings therethrough;
  - a second wall transverse to the vertical axis and including a second plurality of extract flow openings therethrough, the second wall being spaced downwardly from the first wall along the vertical axis; and at least one peripheral seal coupled to at least one of the first wall and the second wall, wherein the at least one peripheral seal is adapted for sealing engagement with the one or more vertical inner walls of the container as the plunger is moved within the container;

wherein the first wall, the peripheral seal, and the second wall cooperate to divide a volume of the container into a lower reservoir for receiving a mixture of infusible material and extract, an upper reservoir for receiving extract separated from the infusible material, and a chamber located between the first wall and the second wall to accommodate extract separated from the infusible material that has passed through the second plurality of extract flow openings prior to passing through the first plurality of extract flow openings; and wherein extract flows from the lower reservoir, through the second plurality of extract flow openings, through the chamber, and through the first plurality of extract flow openings as the plunger is pushed downwardly.

8. The apparatus of claim 7, wherein each of the first wall and the second wall is circular in shape.

9. The apparatus of claim 7, the first plurality of extract flow openings is defined by a first mesh material and the second plurality of extract flow openings is defined by a second mesh material.

10. The apparatus of claim 7, the first plurality of extract flow openings is defined by a first screen material and the second plurality of extract flow openings is defined by a second screen material.

11. The apparatus of claim 7, wherein the first plurality of extract flow openings is defined by a first filter element and the second plurality of extract flow openings is defined by a second filter element.

12. The apparatus of claim 11, wherein at least one of the first filter element and the second filter element comprises a multi-stage filter element formed from a plurality of individual filter elements.

13. A method for creating and separating an infused extract from a mixture of an infusible material and the extract, the method comprising:

providing a container having one or more vertical inner walls oriented parallel to a vertical axis of the container;

filling the container at least partially with a mixture of infusible material and a liquid to form a mixture of infusible material and extract;

disposing a plunger into the container, wherein the plunger is adapted to be moved within the container along the vertical axis thereof, wherein the plunger in turn includes:

a handle adapted to move the plunger within the container along the vertical axis thereof;

a first wall transverse to the vertical axis and defining a first plurality of extract flow openings therethrough;

a second wall transverse to the vertical axis and including a second plurality of extract flow openings therethrough, the second wall being spaced downwardly from the first wall along the vertical axis;

at least one peripheral seal coupled to at least one of the first wall and the second wall, wherein the at least one peripheral seal is adapted for sealing engagement with the one or more vertical inner walls of the container as the plunger is moved within the container;

wherein the first wall, the peripheral seal, and the second wall cooperate to divide a volume of the container into a lower reservoir for receiving a the mixture of infusible material and extract, an upper reservoir for receiving extract separated from the infusible material, and a chamber located between the first wall and the second wall to accommodate extract separated from the infusible material that has passed through the second plurality of extract flow openings prior to passing through the first plurality of extract flow openings;

advancing the plunger along a vertical downward direction into the container to cause the extract to flow from the lower reservoir, through the second plurality of extract flow openings, through the chamber, and then through the first plurality of extract flow opening into the upper reservoir.

14. The method of claim 13, wherein the first plurality of extract flow openings is defined by a first filter element and the second plurality of extract flow openings is defined by a second filter element.

15. The apparatus of claim 14, wherein at least one of the first filter element and the second filter element comprises a multi-stage filter element formed from a plurality of individual filter elements.

16. The method of claim 13, wherein the infusible material includes coffee grounds.

17. The method of claim 13, wherein the infusible material includes tea leaves.

18. The method of claim 13, wherein the infusible material includes herbal tisane.

19. The method of claim 13, wherein the infusible material includes coffee grounds.

20. The method of claim 13, further comprising forming a filter cake of infusible material on a lower-facing surface through which the second plurality of extract flow openings is defined.

* * * * *